US008488947B2

(12) United States Patent
Kanegae et al.

(10) Patent No.: US 8,488,947 B2
(45) Date of Patent: *Jul. 16, 2013

(54) APPARATUS FOR AND METHOD OF RECORDING INFORMATION, APPARATUS FOR AND METHOD OF REPRODUCING INFORMATION, RECORDING MEDIUM, AND INFORMATION RECORDING MEDIUM

(75) Inventors: Tohru Kanegae, Tokorozawa (JP); Masanori Nakahara, Tokorozawa (JP); Takao Sawabe, Tokorozawa (JP); Takeshi Koda, Tokorozawa (JP); Nobuyuki Takakuwa, Tokorozawa (JP); Yasuko Fukuda, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 1579 days.

This patent is subject to a terminal disclaimer.

(21) Appl. No.: 12/003,593

(22) Filed: Dec. 28, 2007

(65) Prior Publication Data
US 2008/0159719 A1    Jul. 3, 2008

Related U.S. Application Data

(63) Continuation of application No. 10/313,015, filed on Dec. 6, 2002, now Pat. No. 8,027,567.

(30) Foreign Application Priority Data

Dec. 7, 2001   (JP) .............................. P2001-374947

(51) Int. Cl.
*H04N 5/84*    (2006.01)
*H04N 5/89*    (2006.01)
*H04N 9/80*    (2006.01)
*H04N 5/93*    (2006.01)

(52) U.S. Cl.
USPC .......................... 386/332; 386/248; 386/353

(58) Field of Classification Search
USPC ........................................ 386/332, 248, 353
See application file for complete search history.

(56) References Cited

U.S. PATENT DOCUMENTS 5,434,678 A    7/1995  Abecassis
5,627,655 A    5/1997  Okamoto et al.
(Continued)

FOREIGN PATENT DOCUMENTS

CN    1167311    12/1997
EP    1 052 644    11/2000
(Continued)

OTHER PUBLICATIONS

U.S. Office Action dated Jun. 22, 2012 that issued in U.S. Appl. No. 12/003,594 including Double Patenting Rejections on pp. 2-20.

(Continued)

*Primary Examiner* — Gelek W Topgyal
(74) *Attorney, Agent, or Firm* — Drinker Biddle & Reath LLP

(57) ABSTRACT

Provided is an information recording apparatus which, in a state where the content of moving picture image information, etc. can be prevented from being inadvertently recognized by the user due to inadvertent presentation to the user of a relevant representative picture image, enables recording the respective information into a recording medium. A reproduction list PL that is to be reproduced is not only recorded into an optical disc 1 but is there also recorded in it a reproduction list display prohibition flag PHF indicating at least whether limiting the display of a representative picture image that represents the content of the reproduction list PL.

12 Claims, 25 Drawing Sheets

U.S. PATENT DOCUMENTS

| | | |
|---|---|---|
| 5,732,185 A | 3/1998 | Hirayama et al. |
| 5,915,067 A | 6/1999 | Nonomura et al. |
| 6,023,551 A | 2/2000 | Sugita et al. |
| 6,052,242 A | 4/2000 | Hirata |
| 6,072,934 A | 6/2000 | Abecassis |
| 6,215,746 B1 | 4/2001 | Ando et al. |
| 6,271,887 B1 | 8/2001 | Ogino et al. |
| 6,285,826 B1 | 9/2001 | Murase et al. |
| 6,553,180 B1 | 4/2003 | Kikuchi et al. |
| 7,327,941 B1 | 2/2008 | Ando et al. |
| 7,469,413 B1 | 12/2008 | Mizutome et al. |
| 7,477,833 B2 | 1/2009 | Kato et al. |
| 2002/0040475 A1 | 4/2002 | Yap et al. |
| 2003/0113096 A1 | 6/2003 | Taira et al. |
| 2005/0089309 A1* | 4/2005 | Ando et al. .................. 386/95 |

FOREIGN PATENT DOCUMENTS

| | | |
|---|---|---|
| EP | 1 059 640 A2 | 12/2000 |
| JP | 08-235758 | 9/1996 |
| JP | 11-205719 A | 7/1999 |
| JP | 11-238363 | 8/1999 |
| JP | 11-341443 | 10/1999 |
| JP | 2000-13720 A | 1/2000 |
| JP | 2000-253364 A | 9/2000 |
| JP | 2000-306327 | 11/2000 |
| JP | 2000-311417 | 11/2000 |
| JP | 2001-215946 | 8/2001 |
| WO | WO 00/14744 | 3/2000 |
| WO | WO 00/51346 | 8/2000 |
| WO | WO 01/82608 | 11/2001 |

OTHER PUBLICATIONS

Patent Abstracts of Japan of Japanese Patent laid-open No. 2000-57746, published Feb. 25, 2000 (abstract only).

\* cited by examiner

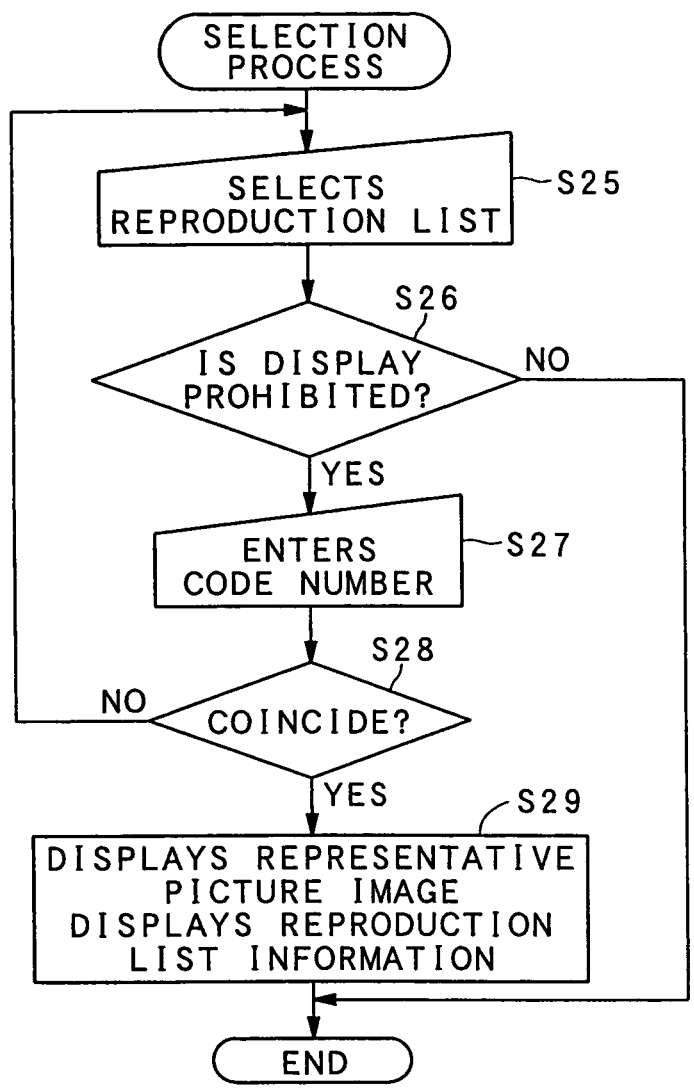

APPARATUS FOR AND METHOD OF RECORDING INFORMATION, APPARATUS FOR AND METHOD OF REPRODUCING INFORMATION, RECORDING MEDIUM, AND INFORMATION RECORDING MEDIUM

This is a continuation application of copending application Ser. No. 10/313,015, filed on Dec. 6, 2002 now U.S. Pat. No. 8,027,567 which is incorporated by reference herein in its entirety.

BACKGROUND OF THE INVENTION

1. Field of the Invention

The present invention relates to an apparatus for and a method of recording information, an apparatus for and a method of reproducing information, a recording medium, and an information recording medium and, more particularly, to an apparatus for and a method of recording information which are intended, in order that information recorded in a recording medium may be reproduction-controlled, to record this information, an apparatus for and a method of reproducing information which are intended to reproduce the information that has been recorded while performing reproduction control with respect to it, and a recording medium having recorded therein the information recording program, or information reproducing program, or information for performing the reproduction control.

2. Description of the Related Art

In recent years, information recording/reproducing apparatuses which enable moving picture image information to be recorded into a large capacity of recording medium such as a DVD (Digital Versatile Disc), etc. and at the same time enable such moving picture image information to be reproduced have been being generalized.

And, in each of those information recording/reproducing apparatuses, it is constructed in the way in which, as described, for example, in Japanese Patent Application Laid-Open No. 2000-35375, for making easy the search, etc. of the respective moving picture image information that has been recorded, a representative picture image (the "thumb-nail picture image") symbolically representing the content of the respective moving picture image information is recorded in the recording medium separately from that moving picture image information; and, when reproducing the respective moving picture image information, the corresponding representative picture image is displayed in advance of the time when performing that reproduction to thereby enable a searching of the moving picture image information, etc. to be reproduced.

On the other hand, in the above-described information recording/reproducing apparatus, in a case where reproducing a recording medium having recorded therein specified moving picture image information, etc. (hereinafter referred to, simply, as "the specified moving picture image information, etc.") the presentation of which to a person whose age is below 18 for example is prohibited, in many cases a function to limit the execution of the reproduction processing of the specified moving picture image information, etc. is added to the information recording/reproducing apparatus as the function of this apparatus itself.

However, in the construction of the above-described conventional information recording/reproducing apparatus, although, indeed, executing the reproduction processing of the specified moving picture image information, etc. itself can be limited, up to the reproduction of the above-described representative picture image corresponding to that specified moving picture image information, etc. is not limited. As a result, there was the problem that it is impossible to hide the content of the specified moving picture image information.

Further, regarding the moving picture image information, etc. containing therein very personal information, as well, similarly, although executing the reproduction processing of that information, etc. itself can be limited, there was the problem that it is impossible to limit up to the reproduction of the representative picture image corresponding to the content of that information, etc.

SUMMARY OF THE INVENTION

Thereupon, the present invention has been made in view of the above-described points in problem and has an object to provide an apparatus for and a method of recording information which, in a state where, as a result of the fact that a representative picture image is inadvertently presented to the user, the content of the moving picture image information, etc. can be prevented from being inadvertently recognized by the user, can record the respective information into a relevant recording medium, an apparatus for and a method of reproducing information which can reproduce that respective information that has been recorded while performing reproduction limitation with respect thereto, and a recording medium having recorded therein the information recording program, information reproducing program, or information for use for the performance of the control of that reproduction.

The above object of the present invention can be achieved by an information recording apparatus. The information recording apparatus is provided with: a reproduction information recording device that records reproduction information into a recording medium; and a control information recording device that records into the recording medium a presentation control information that indicates whether the presentation of a content information indicating the content of the reproduction information is limited.

According to the information recording apparatus, since, by limiting the presentation of the content information according to the presentation control information that has been recorded, it is possible to control the presentation of the content information according to the content of the reproduction information, it is possible to prevent the content of the reproduction information from being inadvertently recognized by the user due to the inadvertent presentation of the content information with respect to the user.

In one aspect of the information recording apparatus, the content information is an information which is presented in advance of starting the reproduction processing of the reproduction information.

According to this aspect, since the content information is presented in advance of the time when starting the reproduction processing of the reproduction information, and since, therefore, the presentation of the content information, according to the presentation control information that has been recorded, is limited, it is possible to control the presentation of the content information in advance of the reproduction processing of the reproduction information.

In another aspect of the information recording apparatus, the presentation control information is an information which indicates further whether the reproduction of the reproduction information is limited.

According to this aspect, since the presentation control information has two ways of meaning one of which concerns whether limiting the presentation of the content information and the other of which concerns whether limiting the reproduction processing itself of the reproduction information, and since, therefore, the reproduction processing of the reproduction information itself as well as the presentation of the content information is limited according to the presentation control information, it is possible to prevent the content of the reproduction information from being inadvertently recognized by the user.

In further aspect of the information recording apparatus, the content information includes at least one of a representative picture image information that corresponds to a representative picture image that represents an image contained in the reproduction information, a title information that corresponds to a title representing the reproduction information, a gist information indicating the gist of the reproduction information, and a time/date information indicating a time/date regarding the reproduction information.

According to this aspect, since the content information contains therein at least one of the representative picture image, title information, gist information, and time/date information, it is possible to prevent that representative picture image, etc. from being inadvertently presented with respect to the user.

The above object of the present invention can be achieved by an information reproducing apparatus for reproducing a recording medium comprising: a reproduction information recording region in which a reproduction information is recorded; and a presentation control information recording region in which a presentation control information, which indicates whether the presentation of content information indicating the content of the reproduction information is limited, is recorded. The information reproducing apparatus is provided with: a detection device that detects the presentation control information from the recording medium; and a limitation device that limits the presentation of the content information based on the detected presentation control information.

According to the information reproducing apparatus, since detecting the presentation control information that has been recorded and limiting, according to the limitation content indicated by that presentation control information, either the reproduction processing or the presentation of the content information, it is possible to control the presentation of the content information according to the content of the reproduction information and it is possible to prevent the content of the reproduction information from being inadvertently recognized by the user due to the inadvertent presentation of the content information with respect to the user.

The above object of the present invention can be achieved by an information recording method. The information recording method is provided with: a reproduction information recording process of recording reproduction information into a recording medium; and a control information recording process of recording into the recording medium a presentation control information that indicates whether the presentation of content information indicating the content of the reproduction information is limited.

According to the information recording method, since, by limiting the presentation of the content information according to the presentation control information that has been recorded, it is possible to control the presentation of the content information according to the content of the reproduction information, it is possible to prevent the content of the reproduction information from being inadvertently recognized by the user due to the inadvertent presentation of the content information with respect to the user.

The above object of the present invention can be achieved by an information reproducing method for reproducing a recording medium comprising: a reproduction information recording region in which a reproduction information is recorded; and a presentation control information recording region in which a presentation control information, which indicates whether the presentation of a content information indicating the content of the reproduction information is limited, is recorded. The information reproducing method is provided with: a detection process of detecting the presentation control information from the recording medium; and a limitation process of limiting the presentation of the content information based on the detected presentation control information.

According to the information reproducing method, since detecting the presentation control information that has been recorded and limiting, according to the limitation content indicated by that presentation control information, either the reproduction processing or the presentation of the content information, it is possible to control the presentation of the content information according to the content of the reproduction information and it is possible to prevent the content of the reproduction information from being inadvertently recognized by the user due to the inadvertent presentation of the content information with respect to the user.

The above object of the present invention can be achieved by a recording control program that is execute on a computer included in an information recording apparatus. The recording control program is provided with: a reproduction information recording step for recording reproduction information into a recording medium; and a control information recording step for recording into the recording medium a presentation control information that indicates whether the presentation of content information indicating the content of the reproduction information is limited.

According to the recording control program, the recording computer reads out the recording control program and functions to limit the presentation of the content information according to the presentation control information that has been recorded, it is possible to control the presentation of the content information according to the content of the reproduction information, it is possible to prevent the content of the reproduction information from being inadvertently recognized by the user due to the inadvertent presentation of the content information with respect to the user.

The above object of the present invention can be achieved by a reproduction control program that is execute on a computer included in an information reproducing apparatus for reproducing a recording medium comprising: a reproduction information recording region in which there is recorded reproduction information; and a presentation control information recording region in which there is recorded presentation control information that indicates whether the presentation of content information indicating the content of the reproduction information is limited. The reproduction control program is provided with: a detection step for detecting the presentation control information from the recording medium; and a limitation step for limiting the presentation of the content information based on the detected presentation control information.

According to the reproduction control program, the reproducing computer reads out the reproduction control program and functions to detect the presentation control information that has been recorded and limit, according to the limitation content indicated by that presentation control information, either the reproduction processing or the presentation of the content information, it is possible to control the presentation of the content information according to the content of the reproduction information and it is possible to prevent the content of the reproduction information from being inadvertently recognized by the user due to the inadvertent presentation of the content information with respect to the user.

The above object of the present invention can be achieved by an information recording medium. The information recording medium records a program for an information recording is recorded so as to be readable by a computer included in an information recording apparatus, wherein the program allows the computer to function as: a reproduction information recording device that records reproduction information into a recording medium; and a control information recording device that records into the recording medium a presentation control information that indicates whether the presentation of a content information indicating the content of the reproduction information is limited.

According to the information recording medium, the computer reads out the program from the information recording medium and it functions to limit the presentation of the content information according to the presentation control information that has been recorded, it is possible to control the presentation of the content information according to the content of the reproduction information, it is possible to prevent the content of the reproduction information from being inadvertently recognized by the user due to the inadvertent presentation of the content information with respect to the user.

The above object of the present invention can be achieved by an information recording medium. The information recording medium records a program for an information reproducing is recorded so as to be readable by a computer included in an information reproducing apparatus for reproducing a recording medium comprising: a reproduction information recording region in which a reproduction information is recorded; and a presentation control information recording region in which a presentation control information, which indicates whether the presentation of content information indicating the content of the reproduction information is limited, is recorded, wherein the program allows the computer to function as: a detection device that detects the presentation control information from the recording medium; and a limitation device that limits the presentation of the content information based on the detected presentation control information.

According to the information recording medium, the computer reads out the program from the information recording medium and it functions to detect the presentation control information from the recording medium and to limit the presentation of the content information based on the detected presentation control information, it is possible to control the presentation of the content information according to the content of the reproduction information and it is possible to prevent the content of the reproduction information from being inadvertently recognized by the user due to the inadvertent presentation of the content information with respect to the user.

The above object of the present invention can be achieved by an recording medium. The recording medium provided with: a reproduction information recording region in which a reproduction information is recorded; and a presentation control information recording region in which a presentation control information, which indicates whether the presentation of content information indicating the content of the reproduction information is limited, is recorded.

According to the recording medium, since, by reading out the presentation control information recorded in the presentation control information recording region and thereby limiting the presentation of the content information according to the presentation control information, it is possible to control the presentation of the content information according to the content of the reproduction information, it is thereby possible to prevent the content of the reproduction information from being inadvertently recognized by the user due to the inadvertent presentation of the content information with respect to the user.

In one aspect of the recording medium, the content information is an information which is presented in advance of starting the reproduction processing of the reproduction information.

According to this aspect, since the content information is presented in advance of the time when starting the reproduction processing of the reproduction information, and since, therefore, the presentation of the content information is limited, it is possible to control the presentation of the content information in advance of the reproduction processing of the reproduction information.

In another aspect of the recording medium, the presentation control information is an information which indicates further whether the reproduction of the reproduction information is limited.

According to this aspect, since the presentation control information has two ways of meaning one of which concerns whether limiting the presentation of the content information and the other of which concerns whether limiting the reproduction processing itself of the reproduction information, by reading out the presentation control information recorded in the presentation control information recording region and thereby limiting not only the presentation of the content information but also the reproduction processing of the reproduction information itself according to the presentation control information it is possible to prevent the content of the reproduction information from being inadvertently recognized by the user.

In further aspect of the recording medium, the content information includes at least one of a representative picture image information that corresponds to a representative picture image that represents an image contained in the reproduction information, a title information that corresponds to a title representing the reproduction information, a gist information indicating the gist of the reproduction information, and a time/date information indicating a time/date regarding the reproduction information.

According to this aspect, since the content information contains therein at least one of the representative picture image, title information, gist information, and time/date information, it is possible to prevent that representative picture image, etc. from being inadvertently presented to the user.

BRIEF DESCRIPTION OF THE DRAWINGS

FIG. 10 is a flow chart illustrating the reproduction list selection process according to the first embodiment of the present invention;

DESCRIPTION OF THE PREFERRED EMBODIMENTS

Next, a preferred embodiment of the present invention will now be explained with reference to the drawings.

It is to be noted that the embodiments explained below are the ones in which the present invention has been applied to an information recording/reproducing apparatus wherein information can be recorded and reproduced with respect to a disc-like recording medium (concretely, for example, a DVD enabling rewrite of information with respect thereto a plurality of times, etc. and each of these media is hereinafter referred to simply as "the optical disc") enabling optical recording/reproduction of information with respect thereto a plurality of times.

(I) First Embodiment

First, a first embodiment of the present invention will be explained using FIGS. 1 to 11.

(A) Embodiment of the Recording Format

Initially, before concretely explaining the construction of an information recording/reproducing apparatus according to the first embodiment, using FIG. 1, an explanation will be given of the recording format that is used when recording information with respect to the optical disc by the use of that information recording/reproducing apparatus according to the first embodiment. Incidentally, FIG. 1 is a diagram illustrating a recording format (physical format) of the respective information according to the first embodiment.

Figure 1:
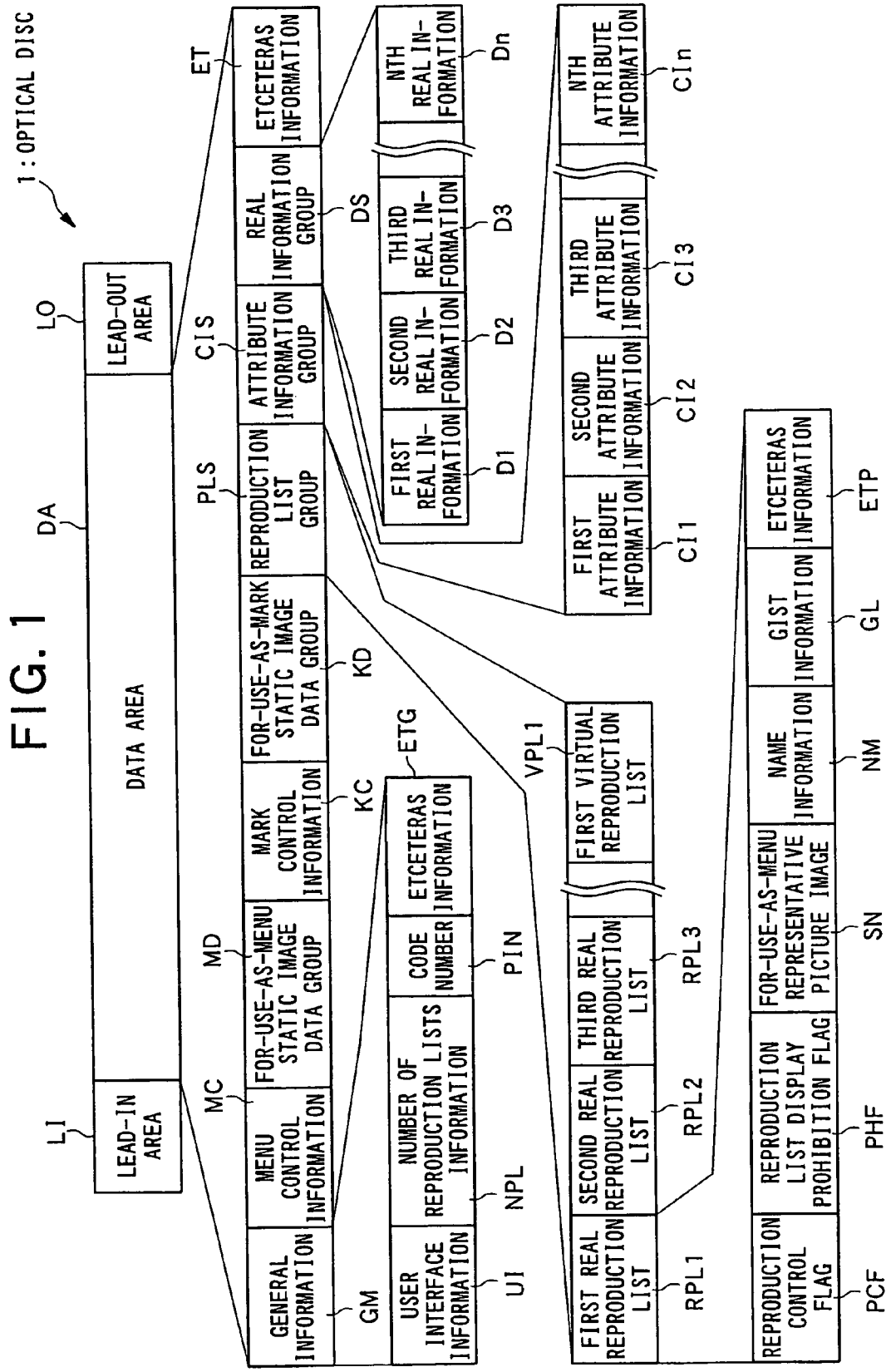
FIG. 1 is a view illustrating a recording format according to a first embodiment of the present invention.

As illustrated in FIG. 1, after information has been recorded, with the information recording/reproducing apparatus, with respect to an optical disc 1 according to the first embodiment, there are formed on the optical disc 1 sequentially from its inner-peripheral side the following three areas. The first area is a lead-in area LI in which there is recorded starting information that is to be read when starting reproduction processing of the information recorded (more specifically, starting information containing therein, for example, the radiation intensity of a light beam for reproduction processing, etc.), the second area is a data area DA in which there are recorded that information to be reproduced, reproduction control information for controlling the way of reproducing that information, etc., and the third area is a lead-out area LO in which there is recorded ending information that is to be read out when ending the reproduction processing of the information recorded.

Next, within the data area DA, there are recorded general information GM, menu control information MC, a for-use-as-menu static image data group MD, mark control information KC, a for-use-as-mark static image data group KD, a reproduction (play) list information group PLS, an attribute information group CIS, a real information group DS, and etceteras information ET that is to be recorded into within the data area DA, in the way in which they have their own divisional regions.

Of those divisional regions, as the general information GM, there are recorded user interface information UI which is information that is displayed to the user when reproducing the information recorded within the data area DA (namely, information having the user interface function), number of reproduction lists information NPL which is information that indicates the total number of reproduction lists recorded within the data area DA in the way described later, a code number PIN according to the present invention which is used when having had display-prohibited a representative picture image representatively indicating the contents of its corresponding reproduction list, etc., and etceteras information ETG which is other information falling under the category of the general information. Incidentally, regarding this code number PIN, in case of the first embodiment, the code numbers PIN associated with all information recorded in the optical disc 1 are recorded in the interior of the general information GM region.

Next, the menu control information MC is control information which is used when showing, as a menu, to the user the representative picture image representative of picture image information, etc. reproduced according to its corresponding reproduction list stored within the reproduction list group PLS region before reproducing it.

Further, as the for-use-as-menu static image data group MD, the static image data corresponding to the representative picture image that is menu-displayed according to the menu control information MG is recorded in units of a reproduction list. In connection with this, each item of static image data has added thereto an identification information identifiable from one another and, when actually reproducing the information according to the content of the reproduction list, that static image data that exists every reproduction list is extracted by using that identification information as a clue.

Next, the mark control information KC is control information which, in order to, for example, cause entry of the code number, is used, for example, when a mark (e.g., an implication icon IC as later described) for entry of that code number is shown to the user together with the menu.

Further, as the for-use-as-mark static image data group KD, there is recorded static image data corresponding to the marks that are shown according to the mark control information KC. At this time, as in the case of the representative picture image, each static image data has added thereto an identification information identifiable from one another and, when a necessary mark is shown, a corresponding necessary static image data is extracted using that identification information as a clue.

Also, as the reproduction (play) list information group PLS there is recorded a plurality of pieces as illustrated in FIG. 1 the reproduction list PL that is used to control the manner of reproducing that is executed when reproducing real information as later described (specifically the manner of reproducing such as the sequential order of reproducing the respective real information, which portion of the respective real information is to be reproduced, the reproduction speed of the respective real information itself, etc.).

In connection with this, the reproduction lists of two kinds are recorded. Namely, as the first kind, there are recorded real reproduction lists RPL1, RPL2, . . . , each of that is in 1:1 correspondence with the corresponding respective real information as later described and the number of that is the same as that of those real information items, and that are used to reproduce one item of real information in completely the same manner as that which was executed when that item of real information was recorded in the optical disc 1. Next, as the second kind, there are recorded virtual reproduction lists VPL that are used to reproduce, as in the case of connecting part of one item of real information and part of another and consecutively reproducing them, part of each of a plurality of real information items in the manner in which those parts are virtually combined together using their corresponding real reproduction (play) lists RPL and in the manner in which those parts go over the divisions each made between each two of the items of real information. At this time, the number of those virtual reproduction lists VPL is set in the way to have no relevancy to the number of the real information items.

Further, within each of the reproduction lists (either the real reproduction lists RPL or the virtual reproduction lists VPL), as illustrated in FIG. 1, there are included the following. A reproduction limit flag PCF that indicates whether limiting the reproduction of the real information indicated by that reproduction list PL (more specifically whether prohibiting the reproduction of that information with respect to a person other than those who are specified), a reproduction list display limit flag PHF that indicates whether limiting the presentation with respect to the user of the representative picture image for use as menu, itself, corresponding to the real information reproduced according to that reproduction list PL, for-use-as-menu representative picture image information SN which is identification information indicating the representative picture image for use as menu that corresponds to the reproduction list PL, name information NM that indicates the name of the real information reproduced according to that reproduction list PL, gist information GL which is text information indicating the gist of the real information, and etceteras information ETP which is other information falling under the category of the reproduction list PL.

Here, as the etceteras information ETP, specifically, there are included information indicating the sequential order of reproduction, address information that indicates the recording position on the optical disc 1 at which there is recorded a portion of the real information that is to be reproduced, information that indicates the reproduction speed of that real information, information that indicates the date on which the reproduction list PL itself was produced, information that indicates the attribute information as later described which should be referred to when reproducing, etc.

Also, as the content of the reproduction control flag PCF, specifically, it is set to "1" when the content of the real information D that is to be reproduced according to the reproduction list PL in which is contained that reproduction control flag PCF is the content with respect to which reproduction control should be performed such as the one in which the reproduction with respect to a person other than those who are specified should be prohibited, and that is set to "0" when that content is the one which should not be reproduction-controlled.

Further, as the content of the reproduction list display prohibition flag PHF, specifically, it is set to "1" when the display of the reproduction list PL in which is contained the reproduction list display prohibition flag PHF, itself, should be prohibited on the menu screen as later described, namely, the display of the representative picture image corresponding to the reproduction list PL should be prohibited on the menu screen, and that is set to "0" when the display of the representative picture image is not prohibited.

Next, as the attribute information group CIS, there are recorded attribute information items corresponding to the respective real information items, which are attribute information items CI1, CI2, CI3, . . . , CIn indicating the attributes (kinds) of those respective real information items, by the number that is the same as that of the real information items. At this time, as the attributes, specifically, there are, for example, a genre's name under which the content of the corresponding real information falls, recording date on which that real information was recorded, and information indicating whether that real information is text information, image information, or voice information. And, these information items are recorded as the attribute information.

Finally, as the real information group DS, one or multiple real information items D1, D2, D3, . . . , Dn are recorded as the information that is to be actually reproduced, together with identification information identifiable from one another. At this time, as this real information, for example, a single piece of film, a single piece of music, etc. is respectively recorded as one item of real information D.

(B) Embodiments of the Construction and Operation of the Information Recording/Reproducing Apparatus Next, the construction and operation of the information recording/reproducing apparatus according to the first embodiment which records/reproduces the real information D with the use of the recording format illustrated in FIG. 1 will be explained using FIGS. 2 to 10.

First of all, the construction and the entire operation of the information recording/reproducing apparatus will be explained using FIG. 2. Incidentally, FIG. 2 is a block diagram illustrating the outline construction of the information recording/reproducing apparatus.

Figure 2:
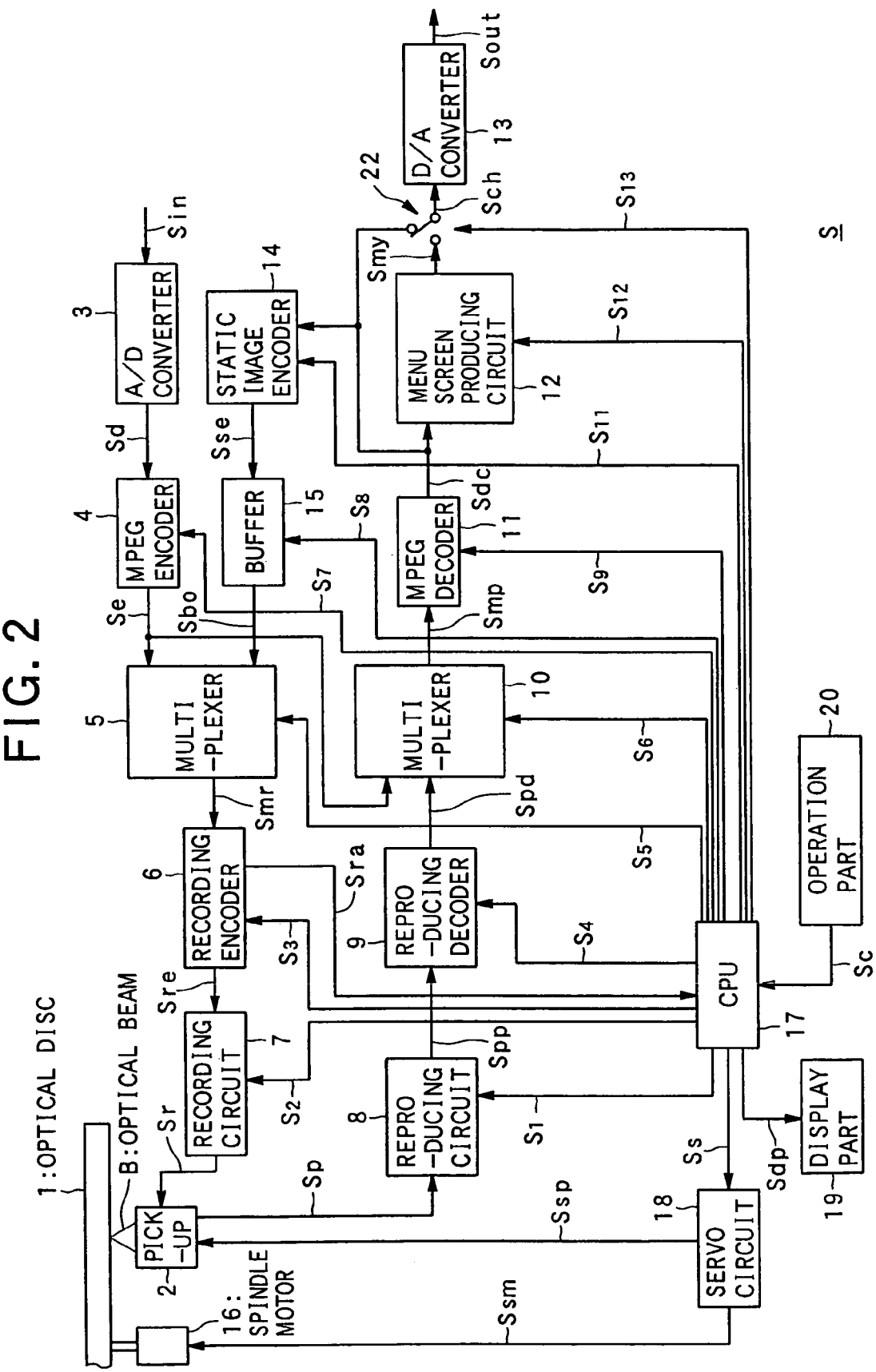
FIG. 2 is a block diagram illustrating a schematic construction of an information recording/reproducing apparatus according to the first embodiment of the present invention.

As illustrated in FIG. 2, the information recording/reproducing apparatus S according to the first embodiment comprises a pickup 2 serving as a detecting device, an A/D (Analog/Digital) converter 3, an MPEG (Moving Picture Coding Expert Group) encoder 4, multiplexers 5 and 10, a recording encoder 6, a recording circuit 7, a reproducing circuit 8, a reproducing decoder 9, an MPEG decoder 11, a menu screen producing circuit 12, a D/A converter 13, a static image encoder 14, a buffer 15, a spindle motor 16, a CPU 17 serving as a reproduction information recording device, a control information recording device, a limiting device, and a prohibiting device, a servo circuit 18, a display part 19, an operation part 20, and a switch 22.

Figure 3:
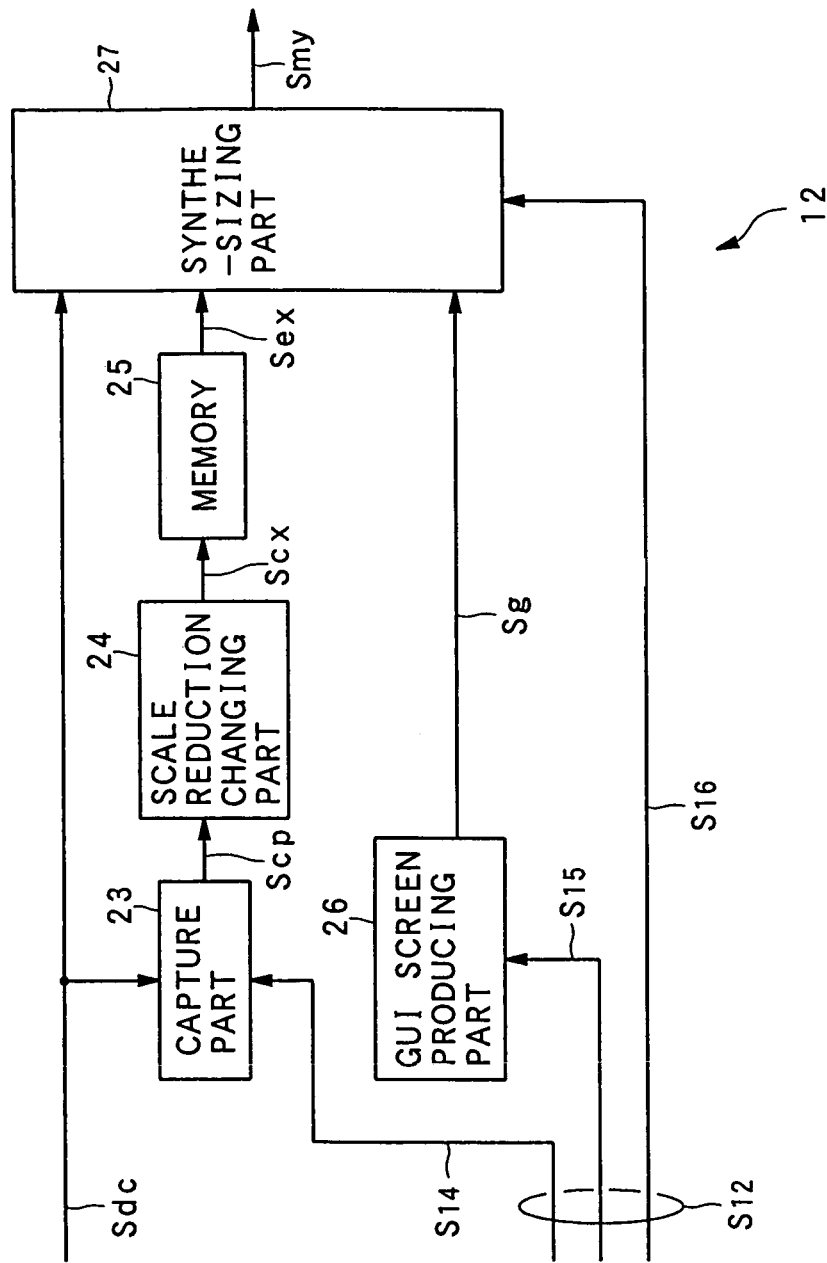
FIG. 3 is a block diagram illustrating the detailed construction of a menu screen producing circuit according to the first embodiment of the present invention.

Further, as illustrated in FIG. 3, the menu screen producing circuit 12 comprises a capture part 23, a scale reduction changing part 24, a memory 25, a GUI (Graphical Users Interface) screen producing part 26, and a synthesizing part 27.

Next, the schematic operation of each of the respective constituent members will be explained using FIGS. 1 to 3.

Initially, an explanation will be given of a case where information to be recorded from the outside (concretely this information to be recorded includes both image information and voice information.) is recorded onto the optical disc 1.

When an information signal Sin corresponding to the information to be recorded is input from the outside and, along therewith, a recording button not illustrated is operated in the operation part 20, first, the A/D converter 3 digitizes that information signal Sin to produce a digital signal Sd and outputs to the MPEG encoder 4.

And, the MPEG encoder 4, according to a control signal $S_7$ that is output from the CPU 17, performs compression of the digital signal Sd that is input on in accordance with the MPEG 2 method, to thereby produce a compression signal Se and outputs it to the multiplexers 5 and 10.

And, the multiplexer 5, according to a control signal $S_5$ that is output from the CPU 17, performs, when necessary, switching between the compression signal Se that is input on and a buffer signal Sbo as later described to thereby produce a changeover recording signal Smr and outputs it to the recording encoder 6.

And, the encoder 6, according to a control signal $S_3$ that is output from the CPU 17, executes with respect to the changeover recording signal Smr that is input on processing for converting the format of the changeover recording signal Smr into the recording format illustrated in FIG. 1, the formatting process, to thereby produce a recording encoded signal Sre and outputs to the recording circuit 7.

At this time, as the formatting process, specifically, first, according to the control signal $S_3$, when necessary, the changeover recording signal Smr that is input is output to the CPU 17 as is. And, the CPU 17, according to the changeover recording signal Smr, produces the above-described general information GM, menu control information MC, for-use-as-menu static image data group MD, mark control information KC, for-use-as-mark static image data group KD, reproduction (play) list information group PLS including the respective reproduction lists PL, attribute information group CIS, real information group DS, and etceteras information ET and outputs these to the recording encoder 6 as the control signal $S_3$. And, as a result of this, the recording encoder 6 produces the recording encoded signal Sre in accordance with the recording format illustrated in FIG. 1. Incidentally, the information for production of the above-described virtual reproduction lists VPL, namely, identification information indicating respective parts of the relevant real information D that should fall under the virtual reproduction list VPL, information indicating the sequential order of reproducing those respective parts, etc. are input from the operation part 20 during the formatting process.

Next, the recording circuit 7, according to a control signal $S_2$ that is output from the CPU 17, converts the recording encoded signal Sre into a recording signal Sr for use for recording and outputs the resulting signal to the pickup 2. At this time, in the recording circuit 7, the "Write Strategy" processing, etc. are executed with respect to the recording encoded signal Sre so as to form in the optical disc 1 the pits the configuration of which accurately corresponds to the information that is to be recorded.

Thereafter, the pickup 2, according to the recording signal Sr that is output from the recording circuit 7, drives a light source not illustrated, such as a semiconductor laser, within this pickup 2 to thereby produce a light beam B such as laser light and radiate it onto the information recording surface of the optical disc 1 and thereby form the pits corresponding to the recording signal and thereby record this recording signal Sr on the optical disc 1. At this time, the optical disc 1 is rotated in a prescribed number of rotations by a spindle motor 16 that is driven according to a spindle control signal Ssm as later described. Incidentally, on the optical disc 1, for example, pits corresponding to the recording signal Sr are formed in accordance with the phase change method, whereby this recording signal Sr is recorded.

On the other hand, the above-described compression signal Se that is output to the multiplexer 10 passes through this multiplexer 10 and is output as a reproduction changeover signal Smp to the MPEG decoder 11.

And, the MPEG decoder 11, according to a control signal $S_9$ that is output from the CPU 17, executes expansion processing with respect to the reproduction changeover signal Smp that is input on (at the time of recording information the compression signal Se itself) in accordance with the MPEG 2 method, and outputs the resulting signal to the menu screen producing circuit 12, static image encoder 14, and one input terminal of the switch 22, as a decoded signal Sdc.

Next, the static image encoder 14, according to a control signal $S_{11}$ that is output from the CPU 17, encodes, as a static image, the image that has been selected, for being made a representative picture image within the menu screen through the execution of a process as later described, from the image information contained in the decoded signal Sdc that is input on. And the static image encoder 14 outputs the resulting signal to the buffer 15 as a static image encoded signal Sse.

As a result of this, the buffer 15, according to a control signal $S_8$ that is output from the CPU 17, temporarily stores the static image encoded signal Sse and reads it out and outputs to the multiplexer 5 as the buffer signal Sbo.

On the other hand, at the time of information recording, the switch 22 is changed over to the decoded signal Sdc side according to a control signal $S_{13}$ that is output from the CPU 17.

And, the decoded signal Sdc is output from the switch 22 to the D/A converter 13 as a changeover signal Sch.

Next, the D/A converter 13 makes the changeover signal Sch analog to produce an output signal Sout corresponding to the information signal Sin and thereby to output it to a later described monitor outside, speaker, not illustrated, outside, etc.

At this time, when recognizing that the recording button not illustrated in the operation part 20 has been operated according to a command signal Sc from that operation part 20, the CPU 17 produces the above-described respective control signals $S_2$, $S_3$, $S_5$, $S_7$, $S_8$, $S_{11}$, and $S_{13}$ and outputs these signals to the above-described respective constituent members to thereby control the above-described respective operations for recording.

Through the performance of the above-explained series of operations at the time of information recording, the image or voice, which corresponds to the recording signal Sr that is presently being recorded, can be recorded while monitoring it on a real-time basis. It is to be noted that at this time information recording the menu screen producing circuit 12 is left out of operation.

Next, the operation that is performed when reproducing the information that is recorded on the optical disc 1 will be explained.

At the time of information reproduction, first, when in the operation part 20 a reproduction button therein that is not illustrated is operated, the pickup 2 radiates a reproduction light beam B onto the optical disc 1 that is rotating and produces, according to that reflected light, a detection signal Sp corresponding to the pit formed in the optical disc 1, and outputs it to the reproducing circuit 8.

Next, the reproducing circuit 8, according to a control signal $S_1$ that is output from the CPU 17, amplifies the detection signal Sp that has been output, with a prescribed amplification factor, and performs reshaping of that waveform to thereby produce a reproduction signal Spp and outputs it to the reproducing decoder 9.

And, the reproducing decoder 9, according to a control signal $S_4$ that is output from the CPU 17, executes unformatting process, which corresponds to the formatting process in the recording encoder 6, with respect to the reproduction signal Spp that is input on, to thereby produce a reproduction decoded signal Spd and outputs it to the multiplexer 10.

Next, the multiplexer 10, according to a control signal $S_6$ that is output from the CPU 17, causes the reproduction decoded signal Spd that is input on to pass there through and outputs it to the MPEG decoder 11 as the reproduction changeover signal Smp.

And, the MPEG decoder 11, according to a control signal $S_9$ that is output from the CPU 17, executes the above-described expansion processing with respect to the reproduction changeover signal Smp that is input on, to thereby produce the decoded signal Sdc. Then, it outputs the decoded signal Sdc to the menu screen producing circuit 12 and one input terminal of the switch 22.

As a result of this, the menu screen producing circuit 12, according to a control signal $S_{12}$ that is output from the CPU 17, using an image that is designated from within the decoded signal Sdc that is input on by that control signal $S_{12}$, produces a menu screen (including therein the above-described representative picture image) for selecting which reproduction list PL the real information D should be reproduced in accordance with when reproducing information. And, it outputs the resulting signal to the other input terminal of the switch 22 as a menu signal Smy.

And, the switch 22, according to a control signal $S_{13}$ that is output from the CPU 17, performs switching between the menu signal Smy that is input on and the decoded signal Sdc and outputs to the D/A converter 13 as the changeover signal Sch.

As a result of this, the D/A converter 13 makes analog the changeover signal Sch and produces an output signal containing therein either one of the information signal Sin and the menu screen signal corresponding to the menu signal Smy and outputs it to a later described monitor outside, speaker, not illustrated, outside, etc.

At this time, the CPU 17, when recognizing according to a command signal Sc from the operation part 20 that a reproduction button not illustrated in that operation part 20 has been operated, produces the above-described control signals $S_1$, $S_4$, $S_6$, $S_9$, $S_{12}$, and $S_{13}$ and outputs them to the above-described relevant constituent members to thereby control the above-described respective operations for reproduction.

In parallel with those respective information recording or information reproducing operations, the CPU 17 produces a control signal Ss for performing servo control of the spindle motor 16 and pickup 2 and outputs it to the servo circuit 18. The servo circuit 18, according to the control signal Ss, produces a spindle control signal Ssm for controlling the rotation of the spindle motor 16 and outputs it to the spindle motor 16. On the other hand, the servo circuit 18 produces, according to that control signal Ss, a pickup control signal Ssp for performing the "tracking servo control" and "focus servo control" in the pickup 2 and outputs it to the pickup 2. And, according to that pickup control signal Ssp, the pickup 2 performs recording of the recording signal Sr or detection of the detection signal Sp while performing tracking servo control and focus servo control with respect to the light beam B.

Incidentally, the information that is needed in order for the user to control the above-described operation of the information recording/reproducing apparatus S is displayed on the display part 19 according to a display signal Sdp from the CPU 17.

Next, the operation of the respective constituent member within the menu screen producing circuit 12 when reproducing information will be explained using FIG. 3.

As illustrated in FIG. 3, the capture part 23 within the menu screen producing circuit 12, according to a control signal $S_{14}$ contained in the above-described control signal $S_{12}$ that is output from the CPU 17, temporarily stores therein that signal of the decoded signal Sdc input on which corresponds to the above-described representative picture image used for constructing the menu screen, and outputs it to the scale reduction changing part 24 as a capture signal Scp.

And, the scale reduction changing part 24 changes the image contained in the capture signal Scp into a reduced scale that is necessary for constructing the menu screen, and outputs the resulting signal to the memory 25 as a scale reduction signal Sex.

Thereafter, the memory 25, after temporarily storing therein the scale reduction signal Sex, outputs it to the synthesizing part 27.

On the other hand, the GUI screen producing part 26, according to a control signal $S_{15}$ contained in the above-described control signal $S_{12}$, produces an image (the "an icon", etc.), other than the image contained in the scale reduction signal Sex, that is necessary for constructing the menu screen, and outputs that signal to the synthesized part 27 as an image signal Sg.

And, the synthesizing part 27, according to a control signal $S_{16}$ contained in the above-described control signal $S_{12}$, produces a menu screen signal by using the scale reduction signal Sex, image signal Sg, and decoded signal Sdc and outputs it to the switch 22 as the above-described menu signal Smy.

Figure 4:
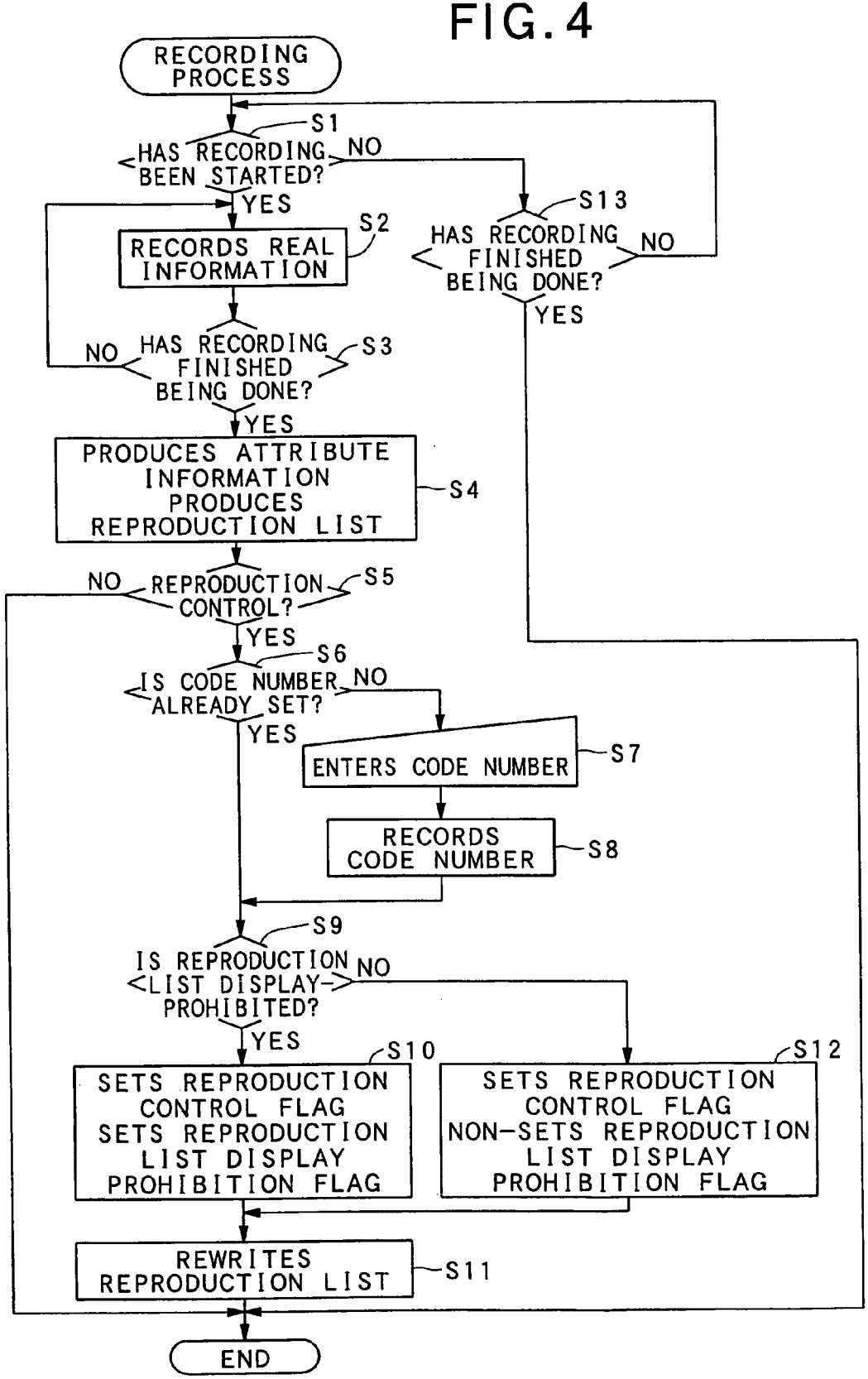
FIG. 4 is a flow chart illustrating the recording process according to the first embodiment of the present invention.

Next, the concrete operation that is performed when recording the real information D, etc. onto the optical disc 1 through the operation of the information recording/reproducing apparatus S having the above-described construction and in accordance with the recording format illustrated in FIG. 1 will be explained using FIG. 4. Incidentally, FIG. 4 is a flow chart illustrating the recording process of the real information D according to the first embodiment which is executed, mainly, according to and from the CPU 17.

In this recording process, initially, it is confirmed whether, in the operation part 20, the start of the recording process has been instructed by a recording button not illustrated (step S1). When the start of the recording process is not instructed (step S1: NO), then, in the operation part 20, it is confirmed whether in the operation part 20 an ending button not illustrated (concretely the power source "off" button, etc.) that indicates the termination of the recording process has been operated (step S13). And, when the ending button is operated (step S13: YES), the recording process according to the first embodiment is terminated as is while, on the other hand, when the ending button is not operated either (step S13: NO), the flow returns to the step S1 and the CPU 17 waits as is.

On the other hand, when the start of the recording operation has been instructed (step S1: YES), next, recording onto the optical disc 1 of the real information that is input on as the above-described information signal Sin is performed (step S2). And, it is confirmed whether recording of all real information D has been terminated (step S3) and, when not terminated (step S3: NO), the recording process goes on being executed as is (step S2). When having been terminated (step S3: YES), next, the attribute information CI corresponding to the respective real information D that has been recorded is produced and, together therewith, corresponding reproduction list PL is also similarly produced. Then, the attribute information CI and reproduction list PL that have been produced are recorded onto the optical disc 1 in accordance with the recording format illustrated in FIG. 1 (step S4).

Next, it is confirmed according to the content of the operation in the operation part 20 whether the content of the real information D that is reproduced according to the produced reproduction list PL is the one with respect to which there should be performed reproduction control such as, for example, prohibiting the reproduction with respect to a person other than specified users (step S5). When that content is not the one with respect to which no reproduction control should be performed (step S5: NO), the recording process according to the first embodiment is terminated as is. When, on the other hand, that content is the one with respect to which reproduction control should be performed (step S5: YES), it is confirmed (step S6), by searching the general information GM region, whether the code number PIN is already recorded within the general information GM of the optical disc 1 having had recorded therein the real information D and reproduction list PL (steps S2 and S4). And, when the code number PIN is not recorded (step S6: NO), a display indicating that a code number PIN should newly be entered is made on the display not illustrated, etc. to thereby prompt the user to do entry processing. When a new code number PIN has been entered correspondingly thereto (step S7), this entered code number PIN is recorded in the region illustrated in FIG. 1 within the general information GM (step S8), then the flow proceeds to the succeeding step S9.

On the other hand, when in the determination made in the step S6 the code number PIN is already recorded (step S6: YES), next, it is confirmed (step S9), according to the operated content of the operation part 20, whether the display of the produced (step S4) reproduction list PL itself should be prohibited on the menu screen, namely whether the display of the representative picture image corresponding to that reproduction list PL should be prohibited on the menu screen. When the display of that representative picture image should not be prohibited (step S9: NO), according to the determination of the step S5 the content of the reproduction control flag PCF that should be included under the corresponding reproduction list PL is set to "1", and, simultaneously, the content of the reproduction list display prohibition flag PHF that should similarly be included under that list PL is set to "0" (step S12).

On the other hand, when the display of that representative picture image is the one which should be prohibited (step S9: YES), according to the determination made in the step S5 the content of the reproduction control flag PCF that should be included under the corresponding reproduction list PL is set to "1". Simultaneously, the content of the reproduction list display prohibition flag PHF that should similarly be included thereunder is set to "1" (step S10).

And, at the point in time when setting the content of the reproduction control flag PCF and the content of the reproduction list display flag PHF has respectively finished being performed (steps S10 and S12), the content of the corresponding reproduction list PL that was recorded (step S4) is rewritten (step S11), thereby the series of processing operations for the recording process are terminated.

Figure 5:
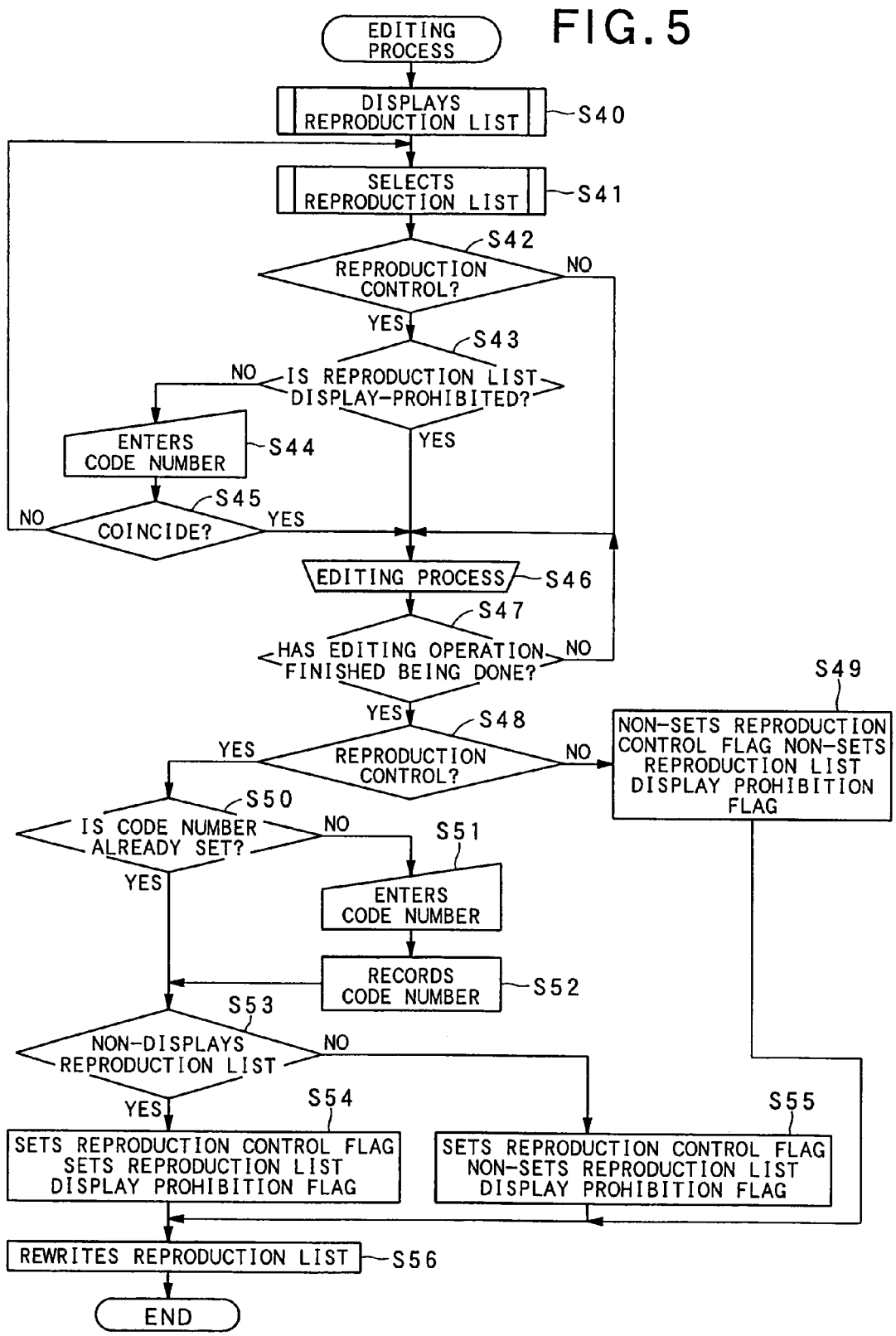
FIG. 5 is a flow chart illustrating the editing process according to the first embodiment of the present invention.

Next, the concrete operation of the editing process for editing the real information D, etc. that is executed in accordance with the recording format illustrated in FIG. 1 through the operation of the information recording/reproducing apparatus S having the above-described construction will be explained using FIG. 5. Incidentally, FIG. 5 is a flow chart illustrating the editing process for the real information D according to the first embodiment that is executed, mainly, according to and from the CPU 17. Also, this editing process, concretely, includes processing for producing a new virtual reproduction list VPL, processing for adding/recording new real information D, processing for changing the content of an existing virtual reproduction list VPL, processing for deleting part of existing real information D from the optical disc 1, etc.

In this editing process, initially, while they are being subjected to control processing such as prohibiting their display through the execution of the processes as later described in detail, the representative picture image corresponding to the respective reproduction list PL recorded on the optical disc 1 is displayed on the display not illustrated (step S40), and, further, by selecting a desired one from among the representative picture images that are being displayed, there is selected a reproduction list PL that is to be edited (step S41).

When the reproduction list Pl is selected, next, whether the real information D corresponding to the selected reproduction list PL is the one with respect to which the above-described reproduction control should be performed is determined by confirming the content of the reproduction control flag PCF within the selected reproduction list (step S42). And, when that real information D is not the one which should be reproduction-controlled (step S42: NO), the flow proceeds to a step S46 as later described as is. On the other hand, when that reproduction list Pl is the one which should be reproduction-controlled (step S42: YES), next, whether the representative picture image corresponding to the reproduction list PL has its display prohibited on the menu screen is determined by confirming the content of the reproduction list display prohibition flag PHF within the selected reproduction list PL (step S43). And, for releasing that display prohibition, the display indicating that the code number PIN, which must have been recorded in the optical disc 1, should be entered is made, for example, on the display not illustrated, etc., to thereby prompt the execution of that entry processing. When correspondingly thereto a new code number PIN has been entered (step S44), collation is made between this entered code number PIN and the code number PIN that is kept recorded in the general information GM region, thereby confirmation is made of whether those code numbers coincide with each other (step S45). As a result of this, when the both do not coincide with each other (step S45: NO), determination is made of that the user who should not view that representative picture image is presently executing the editing process, the flow then returning to the step S41 as is, and the CPU 17 makes the user select a different reproduction list PL. On the other hand, when the entered code number PIN and the code number PIN kept recorded coincide with each other (step S45: YES), next, the desired editing process is executed (step S46) while that selected reproduction list PL is being displayed.

Next, whether the operation to the effect that the editing process has finished being executed has been performed in the operation part 20 is confirmed (step S47). When having not finished (step S47: NO), the editing process goes on being executed as is. When, on the other hand, having already finished (step S47: YES), whether the content of the real information D that is to be reproduced according to the post-edit reproduction list PL is the one with respect to which reproduction control should be performed is determined according to the content of the operation in the operation part 20 (step S48). When that content is not the one with respect to which reproduction control should be performed (step S48: NO), the reproduction control flag PCF in the newly produced reproduction list PL is set to "0" and simultaneously the reproduction list display prohibition flag PHF is set to "0" (step S49), and the flow proceeds to the processing of a step S56 as later described.

On the other hand, when the content of the real information D that is to be reproduced according to the post-edit reproduction list PL is the one which should be reproduction-controlled (step S48: YES), next, whether the code number PIN is already recorded within the general information GM region of the optical disc 1 in which the post-edit reproduction list PL was recorded (step S46) is confirmed by searching that general information GM region (step S50). And, when the code number PIN is not recorded (step S50: NO), the display indicating that the code number PIN should be newly entered is made, for example, on the display not illustrated, etc., to thereby prompt the execution of that entry processing. When correspondingly thereto a new code number PIN has been entered (step S51), this entered code number PIN is recorded into the zone illustrated in FIG. 1 within the general information GM region (step S52), and the flow proceeds to the succeeding step S53.

On the other hand, when in the determination of the step S50 the code number PIN is already recorded (step S50: YES), next, whether the display of the representative picture image corresponding to the produced (step S46) reproduction list PL is the one which should be prohibited in the relevant menu screen is confirmed (step S53) according to the content of the operation in the operation part 20. And when that display of the representative picture image is not the one which should be prohibited (step S53: NO), the content of the reproduction control flag PCF that should be included under the corresponding reproduction (play) list PL is set to "1" according to the determination in the step S48 and, simultaneously, the content of the reproduction list display prohibition flag PHF that should similarly be included thereunder is set to "0" (step S55).

On the other hand, when the display of that representative image is the one which should be prohibited (step S53: YES), the content of the reproduction control flag PCF that should be included under the corresponding reproduction (play) list PL is set to "1" according to the determination in the step S48 and, simultaneously, the content of the reproduction list display prohibition flag PHF that should similarly be included thereunder is set to "1" (step S54).

And, at the point in time when setting the content of the reproduction control flag PCF and the content of the reproduction list display flag PHF has respectively finished being performed (steps 49 and 55), the content of the corresponding reproduction list PL that was recorded (step S46) is rewritten (step S56), thereby the series of processing operations for the editing process are terminated.

Next, the detail of the display process (step S40) for the representative image corresponding to the reproduction list PL in the above-described editing process will be explained using FIGS. 6 and 7. Incidentally, FIG. 6 is a flow chart illustrating the display process for a reproduction list according to the first embodiment, and FIG. 7 is a view illustrating an example of display of a reproduction list according to the first embodiment.

Figure 6:
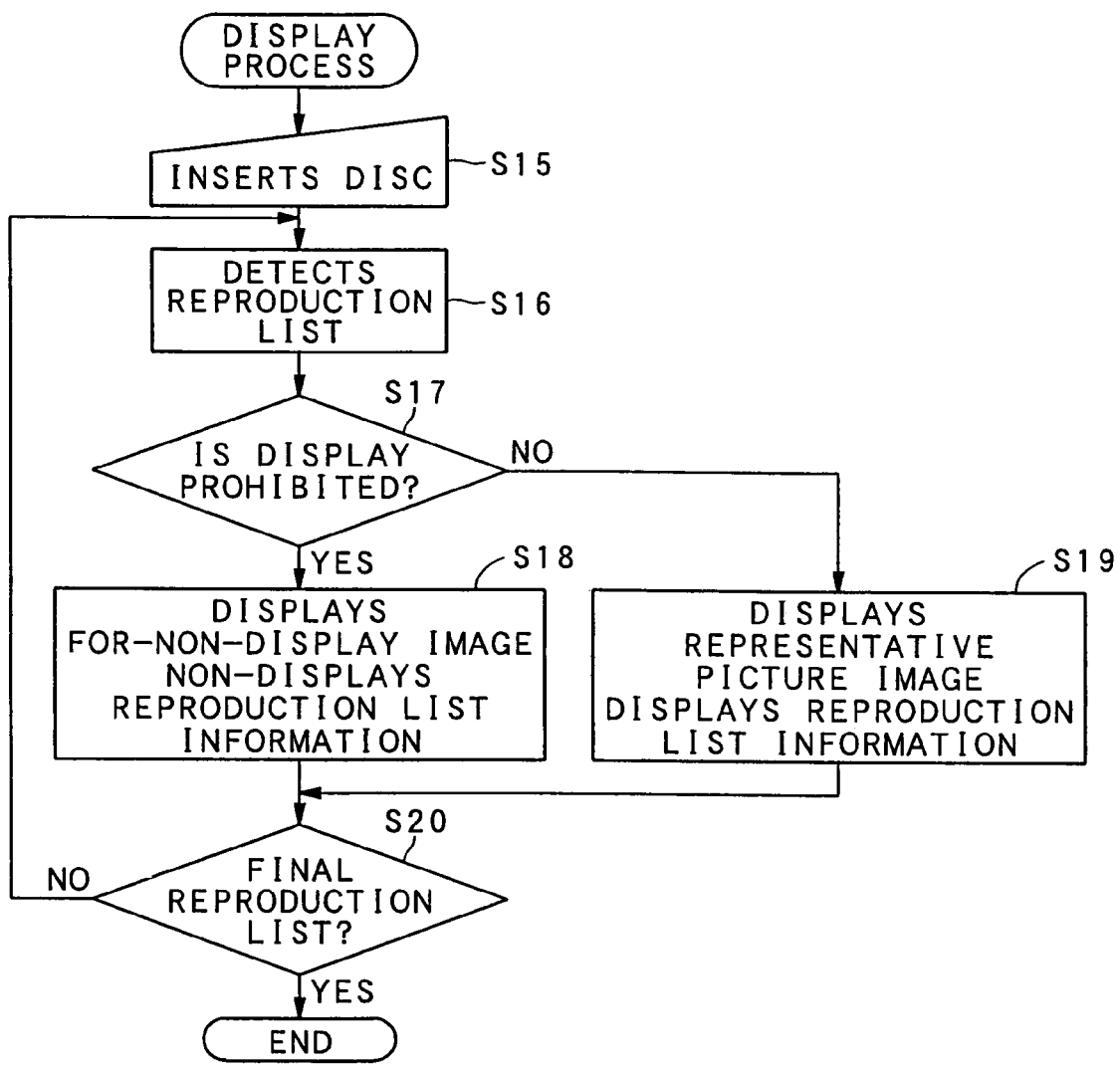
FIG. 6 is a flow chart illustrating the reproduction list display process according to the first embodiment of the present invention.

As illustrated in FIG. 6, in the display process for the representative picture image in the step S40, first, the optical disc 1 is inserted (step S15) into an insertion opening not illustrated for this optical disc 1 in the information recording/reproducing apparatus S, and all reproduction lists PL recorded in the thus-inserted optical disc 1 are detected (step S16).

And, regarding the respective reproduction list PL detected, whether their corresponding representative picture image is set to be display-prohibited on the menu screen is determined by confirming the content of the reproduction list display prohibition flag PHF in the respective reproduction list PL (step S17).

And, when that representative picture image is not display-prohibited (step S17: NO), the corresponding representative picture image is displayed, as indicated by the symbol SI, within the menu screen M illustrated in, for example, FIG. 7A and, in addition, according to the necessity, the reproduction list information such as the name, production date, etc. of the reproduction list PL itself is displayed by searching the interior of this reproduction list PL (step S19), then the flow proceeds to a step S20.

On the other hand, when in the determination of the step S17 the corresponding representative picture image is display-prohibited (step S17: YES), the corresponding representative picture image is displayed, for example, in such a manner as to make an illustration of it within the menu screen of FIG. 7A as a for-non-display image SSI, so that the content of that representative picture image cannot be recognized. And, in addition, the above-described reproduction list information is not displayed (step S18).

And, whether display processing has finished being executed up to the representative picture image corresponding to a final reproduction list PL is confirmed (step S20). When that has not finished being executed (step S20: NO), the flow returns to the step S16, thereby the above-described steps of processing operations are repeated again. On the other hand, when that has already finished being executed (step S20: NO) up to the display of the representative picture image corresponding to the final reproduction list PL, the flow proceeds to step S41 as is.

Figure 7A:
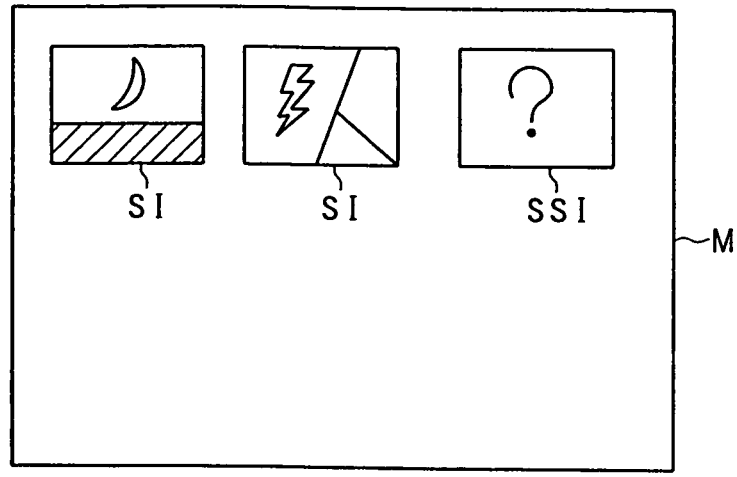
FIG. 7A is a view illustrating examples of display (I) of the menu screen according to the first embodiment of the present invention.
Figure 8:
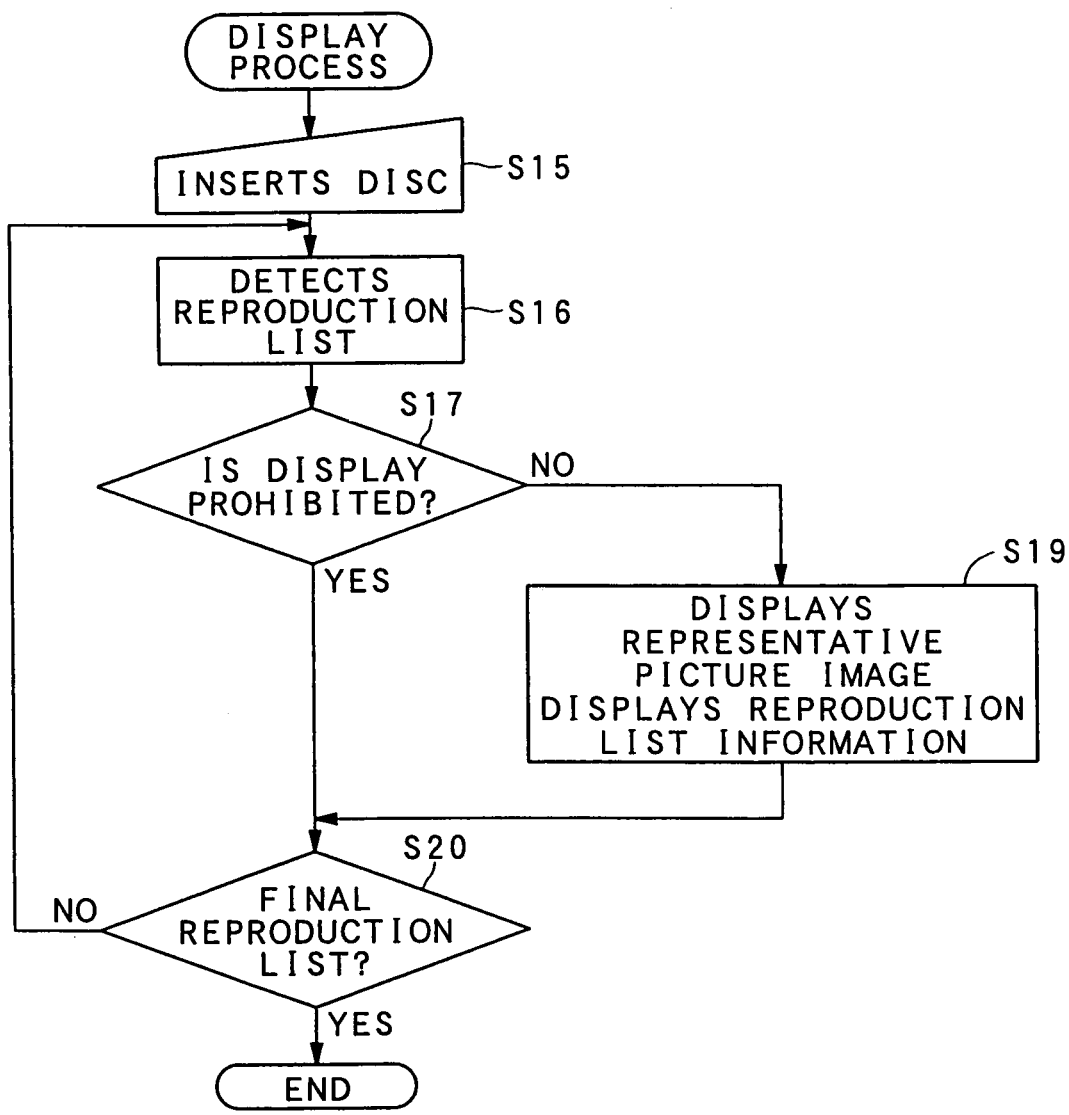
FIG. 8 is a flow chart (II) illustrating the reproduction list display process according to the first embodiment of the present invention.
Figure 9A:
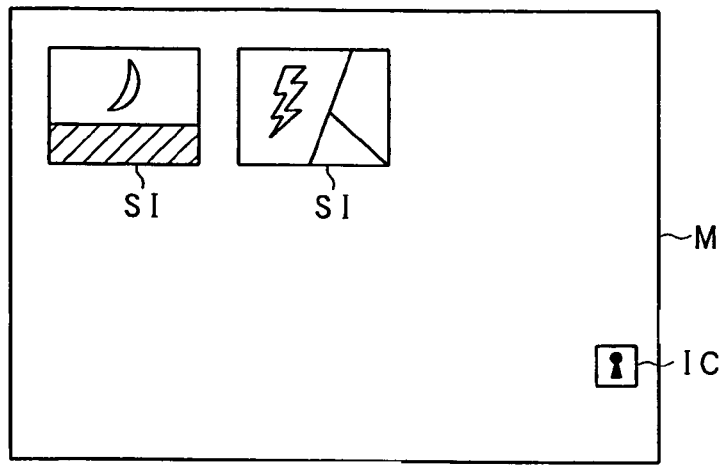
FIG. 9A is a view illustrating examples of display (IV) of the menu screen according to the first embodiment of the present invention.

Incidentally, in the display process illustrated in FIG. 6, regarding the representative picture image the display of that is prohibited, in place of that representative picture image, measure has been taken of displaying the for-non-display image SSI illustrated in FIG. 7A. However, other than this, regarding the reproduction list PL the corresponding representative picture image to which is display-prohibited, measure may also be taken of making no display of any images at the corresponding position as illustrated in FIG. 8 (see FIG. 9A) and of only displaying the representative picture image SI the display of which is permitted (step S19). At this time, as illustrated in FIG. 9A, at a part of the interior of the menu screen M, an implication icon IC that implies the existence of the representative picture image (reproduction list PL) the display of which is prohibited may be displayed together with the representative picture image SI the display of which is permitted.

Next, the detail of the selection processing (step S41) of the reproduction list PL in the above-described editing process will be explained using FIG. 10. Incidentally, FIG. 10 is a flow chart illustrating the selection process of the reproduction list according to the first embodiment.

As illustrated in FIG. 10, in the selection process of the reproduction list PL that is executed in the above-described step S41, first, when the menu screen M illustrated in FIG. 7 is displayed by the execution of the above-described step S40, next, the processing for selecting the reproduction list PL in that menu screen M is executed in the operation part 20 (step S25), next, it is determined whether that reproduction list PL that has been selected is the one the corresponding representative picture image of that is display-prohibited (step S26).

Figure 7B:
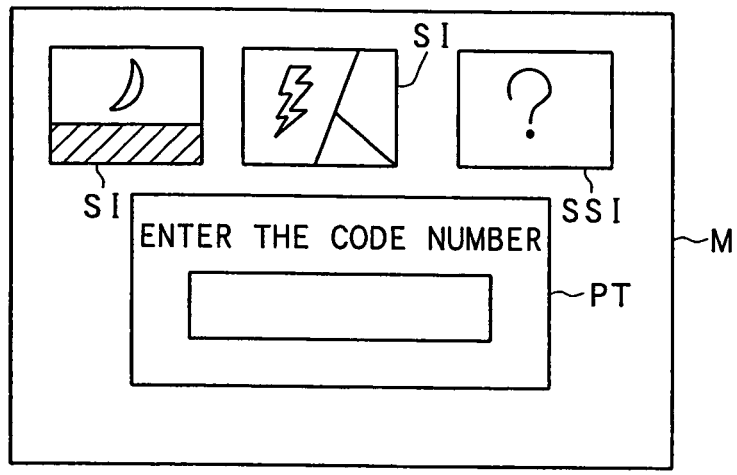
FIG. 7B is a view illustrating examples of display (II) of the menu screen according to the first embodiment of the present invention.
Figure 7C:
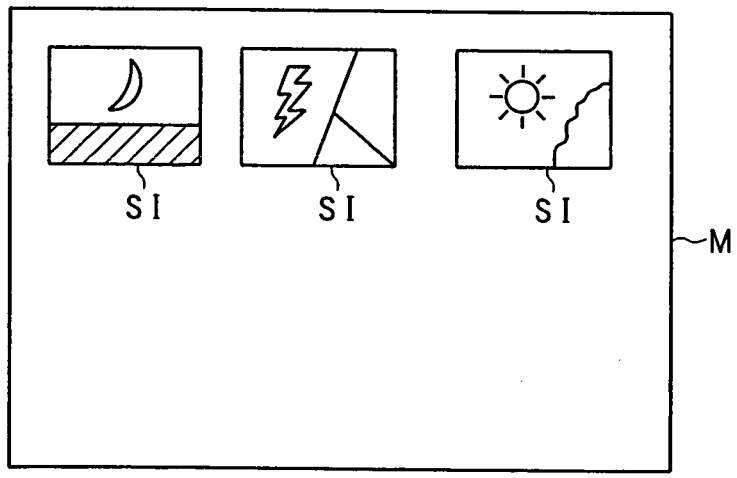
FIG. 7C is a view illustrating examples of display (III) of the menu screen according to the first embodiment of the present invention.

And, in a case where the reproduction list PL the representative picture image SI of that is not display-prohibited has been selected (step S26: NO), the flow proceeds to the step S42 as is. On the other hand, in a case where the reproduction list PL the representative picture image SI of that is display-prohibited has been selected (step S26: YES), then, for releasing the prohibition of that display, as illustrated in FIG. 7B, a field PT for entry that indicates that the code number PIN which must have been recorded in the optical disc 1 is to be entered is displayed on the menu screen M to thereby prompt the execution of the entry processing. When correspondingly thereto that code number PIN has been entered (step S27), collation is made between that entered code number PIN and the code number PIN recorded in the general information GM region, and it is confirmed whether those code numbers coincide with each other (step S28). As a result of this, when the both do not coincide (step S28: NO), it is determined that the user who should not view that representative picture image is presently executing the edit process. Thereby, the flow returns to the step S25 to thereby cause the user to select a different reproduction list PL. On the other hand, when the input code number PIN and the recorded code number PIN have coincided with each other (step S28: YES), then as illustrated in FIG. 7C a corresponding representative picture image SI is newly displayed within the menu screen M. And, in addition, the reproduction list information such as the name, production date, etc. of the reproduction list PL itself is displayed, according to the necessity, by searching the interior of that reproduction list PL (step S29). Then, the flow proceeds to the above-described step S42.

Figure 9B:
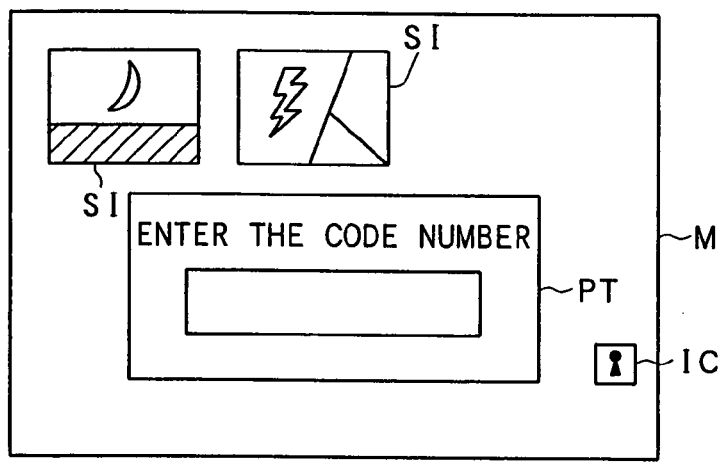
FIG. 9B is a view illustrating examples of display (V) of the menu screen according to the first embodiment of the present invention.
Figure 9C:
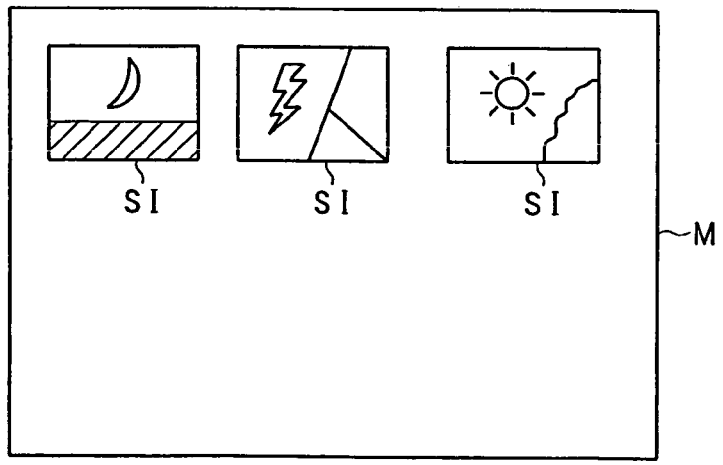
FIG. 9C is a view illustrating examples of display (VI) of the menu screen according to the first embodiment of the present invention.

Incidentally, in the above-described selection process of the reproduction list PL, in a case where regarding the representative picture image SI that is determined as being display-prohibited as illustrated in FIG. 8 no display whatsoever is made (step S40), as illustrated in FIG. 9A the implication icon is left displayed. And, when in this state that implication icon IC has been selected (step S25), for releasing that prohibition of the display the CPU 17 prompts, as illustrated in FIG. 9B, the execution of the entry processing for the code number PIN by displaying the entry field PT on the menu screen M. When correspondingly to this that code number PIN is entered (step S27) and it has coincided with the code number PIN recorded within the general information GM (step S28: YES), as illustrated in FIG. 9C the corresponding representative picture image SI is newly displayed within the menu screen M and, in addition, the implication icon IC is deleted from within the menu screen. And, in addition, according to the necessity, the reproduction list information such as the name, production date, etc. of the reproduction list PL itself is displayed by searching the interior of that reproduction list (step S29). Then, the flow proceeds to the step S42.

Finally, the concrete operation of the reproduction process for reproducing the real information D, etc. from the optical disc 1, which is executed in accordance with the recording format illustrated in FIG. 1 by the information recording/reproducing apparatus S having the above-described construction will be explained using FIG. 11. Incidentally, FIG. 11 is a flow chart illustrating the reproduction process for the real information D according to the first embodiment which is executed mainly according to and from the CPU 17.

Figure 11:
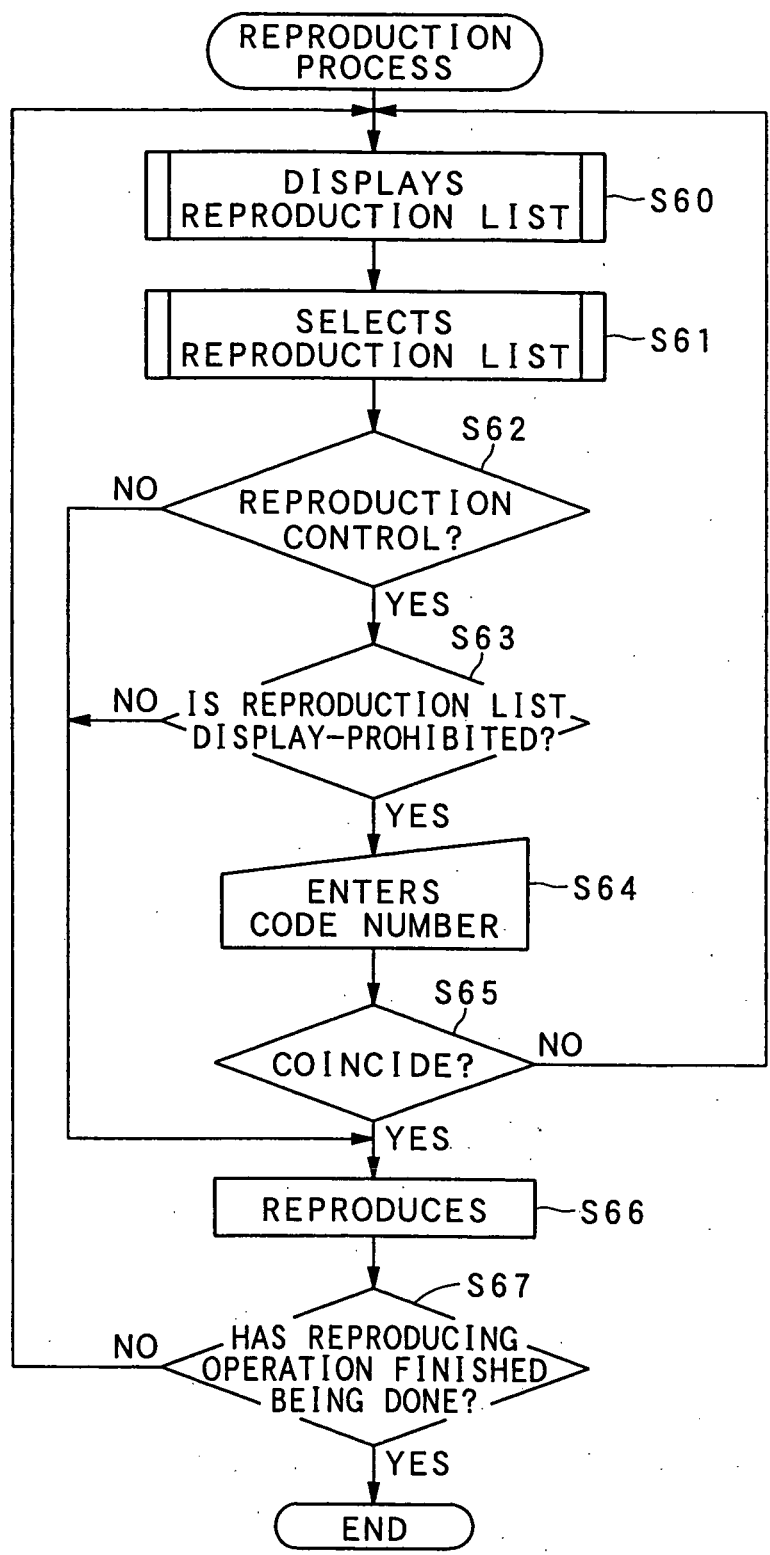
FIG. 11 is a flow chart illustrating the reproduction process according to the first embodiment of the present invention.

As illustrated in FIG. 11, as the reproduction process, first, the display processing for reproduction list PL (step S60) and the selection processing therefor (step S61) which are the same as those executed in the editing process illustrated in FIG. 5 are executed.

And, when the display processing and selection processing for the reproduction list PL having the contents that are to be reproduced has finished being executed, next, whether the content of the real information D that is reproduced according to the selected reproduction list PL is the one with respect to which reproduction control should be performed is determined (step S62) by confirming the content of the reproduction control flag PCF within that selected reproduction list PL. When that content is not the one with respect to which reproduction control should be performed (step S62: NO), according to the content of this selected reproduction list PL the corresponding real information D is reproduced, as is, from the optical disc 1 (step S66). Further, whether reproduction up to final real information D that is to be reproduced has finished being performed is confirmed (step S67).

And, when reproduction processing up to the final reproduction list PL has not finished being executed yet (step S67: NO), the flow returns to the preceding step S60 so as to select the next reproduction list PL including therein the real information D to be reproduced. On the other hand, when reproduction processing has already finished being executed up to the final reproduction list PL to be reproduced (step S67: YES), the reproduction process according to the first embodiment is ended as is.

On the other hand, when in the determination of the step S62 the content of the selected reproduction list PL is the one with respect to which reproduction control should be performed (step S62: YES), next, it is determined whether the selected reproduction list PL is the one PL the corresponding representative picture image of which is display-prohibited (step S63).

And, when that reproduction list PL is the one PL the representative picture image of which is not determined as being display-prohibited (step S63: NO), the flow proceeds to the step S66 as is. On the other hand, when that reproduction list PL is the one the representative picture image of which is determined as being display-prohibited (step S63: YES), next, for releasing that prohibition of the display, as illustrated in FIG. 7B for example, the field PT for entry that indicates that the code number PIN which must have been recorded in the optical disc 1 is to be entered is displayed on the menu screen M to thereby prompt the execution of the entry processing. When correspondingly thereto that code number PIN has been entered (step S64), collation is made between that entered code number PIN and the code number PIN recorded in the general information GM region, and it is confirmed whether those code numbers coincide with each other (step S65). As a result of this, when the both do not coincide (step S65: NO), it is determined that the user who should not view that representative picture image is presently executing the edit process. Thereby, the flow returns to the step S60 to thereby cause the user to select a different reproduction list PL. On the other hand, when the input code number PIN and the recorded code number PIN have coincided with each other (step S65: YES), then for reproducing the real information D corresponding to the content of the reproduction list PL the flow proceeds to the above-described steps S66 and S67, thereby the CPU 17 terminates the reproduction process according to the first embodiment.

As has been explained above, according to the operation of the information recording/reproducing apparatus of the first embodiment, by limiting (prohibiting) the display of the representative picture image according to the reproduction list display prohibition flat PHF that is recorded, it is possible to control the display of the representative picture image according to the content of the reproduction list PL. Therefore, it is possible to prevent the content of the real information D corresponding to the reproduction list PL from being inadvertently recognized by the user as a result of the inadvertent presentation of the representative picture image to the user.

Also, since the representative picture image is displayed before starting the reproduction process for the real information D corresponding to the reproduction list PL, by limiting the display of the representative picture image according to the reproduction list display prohibition flag PHF that is recorded it is possible to control the display of the representative picture image that precedes the reproduction process for the real information D corresponding to the reproduction list PL.

(II) Second Embodiment

Next, a second embodiment that is another embodiment according to the present invention will be explained using FIGS. 12 to 15.

Although in the above-described first embodiment the code number PIN has been recorded, within the general information GM, as the code number that is common to every item of the real information D and every piece of the reproduction lists PL, in the second embodiment that will be explained below a specific code number is set every reproduction list PL.

Incidentally, in FIGS. 12 to 15 that will be explained below, the same members as those in the corresponding figures used in the first embodiment are denoted by the same member numerals and the explanation of the detail thereof will be omitted.

Also, since the construction of the information recording/reproducing apparatus according to the second embodiment is the same as that of the information recording/reproducing apparatus S according to the first embodiment illustrated in FIG. 2, the explanation of the detail will be omitted.
(A) Embodiment of the Recording Format Initially, before concretely explaining the construction, etc. of the information recording/reproducing apparatus according to the second embodiment, the recording format used when recording information with respect to the optical disc 1 by the information recording/reproducing apparatus according to the second embodiment will be explained using FIG. 12. Incidentally, FIG. 12 is a view illustrating the recording format (physical format) of the respective information according to the second embodiment.

As stated above, since in the recording format of the second embodiment a specific code number is set correspondingly to each reproduction list PL, that code number is recorded not within the general information GM but within the respective reproduction list PL.

Figure 12:
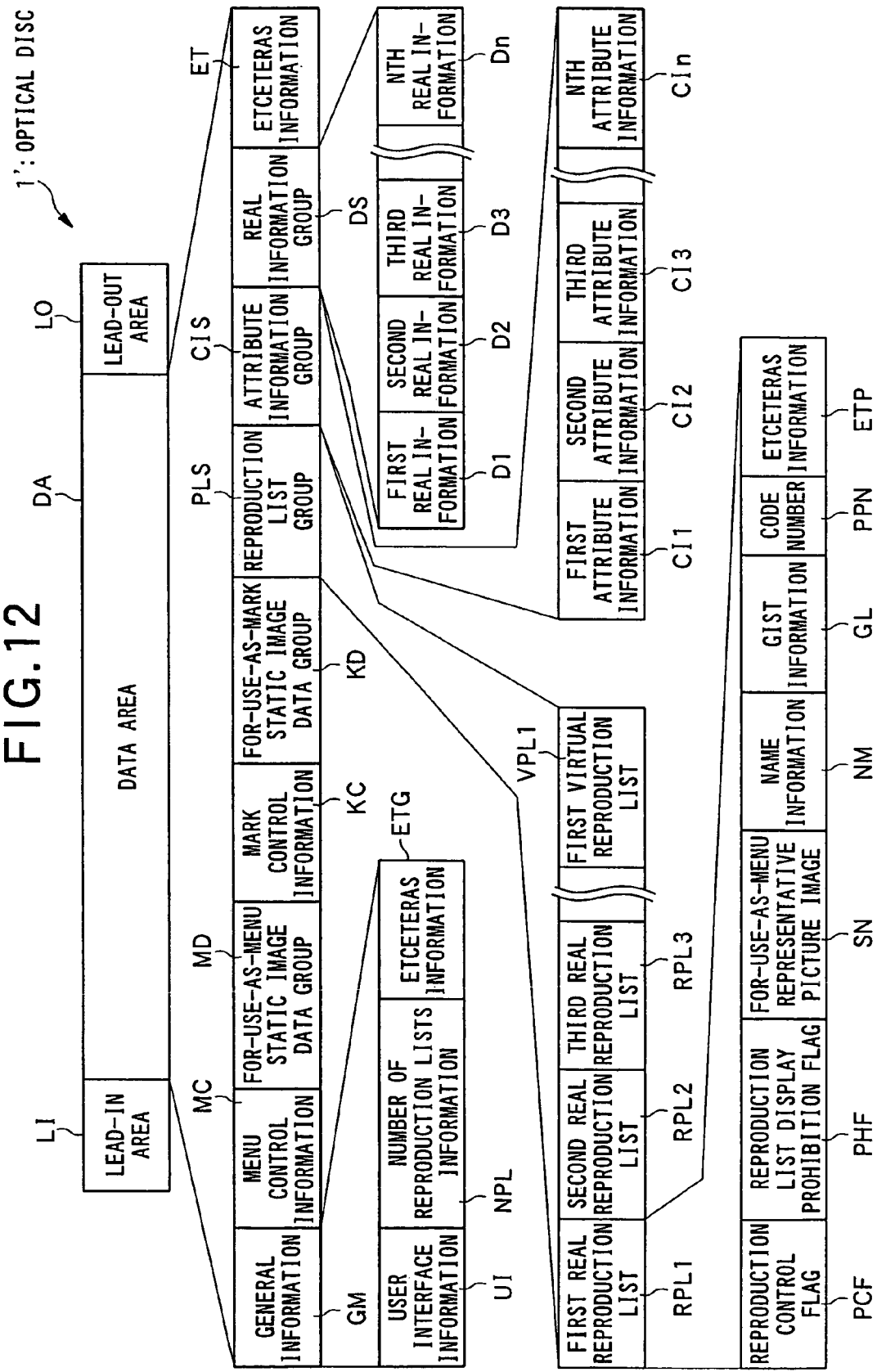
FIG. 12 is a view illustrating a recording format according to a second embodiment of the present invention.

Namely, as illustrated in FIG. 12, in the recording format according to the second embodiment, the general information GM is constructed of only the user interface information UI, reproduction lists number information NPL, and etceteras information ETG that are the same as those illustrated in FIG. 1. On the other hand, the respective reproduction list PL region has recorded therein a code number PPN different every reproduction list PL in addition to the reproduction control flag PCF, reproduction list display prohibition flag PHF, for-use-as-menu representative picture image information SN, name information NM, gist information GL, and etcetera information ETP that are the same as those illustrated in FIG. 1.

Incidentally, the other construction of the recording format of the second embodiment is the same as the corresponding that of the recording format of the first embodiment illustrated in FIG. 1 and therefore the explanation of the detail thereof will be omitted.
(B) Embodiment of the Construction and Operation of the Information Recording/Reproducing Apparatus Next, the operation of the information recording/reproducing apparatus according to a second embodiment of the present invention will be explained using FIGS. 13 to 15.

First, the recording process for the real information D according to the second embodiment will be explained using FIG. 13.

Figure 13:
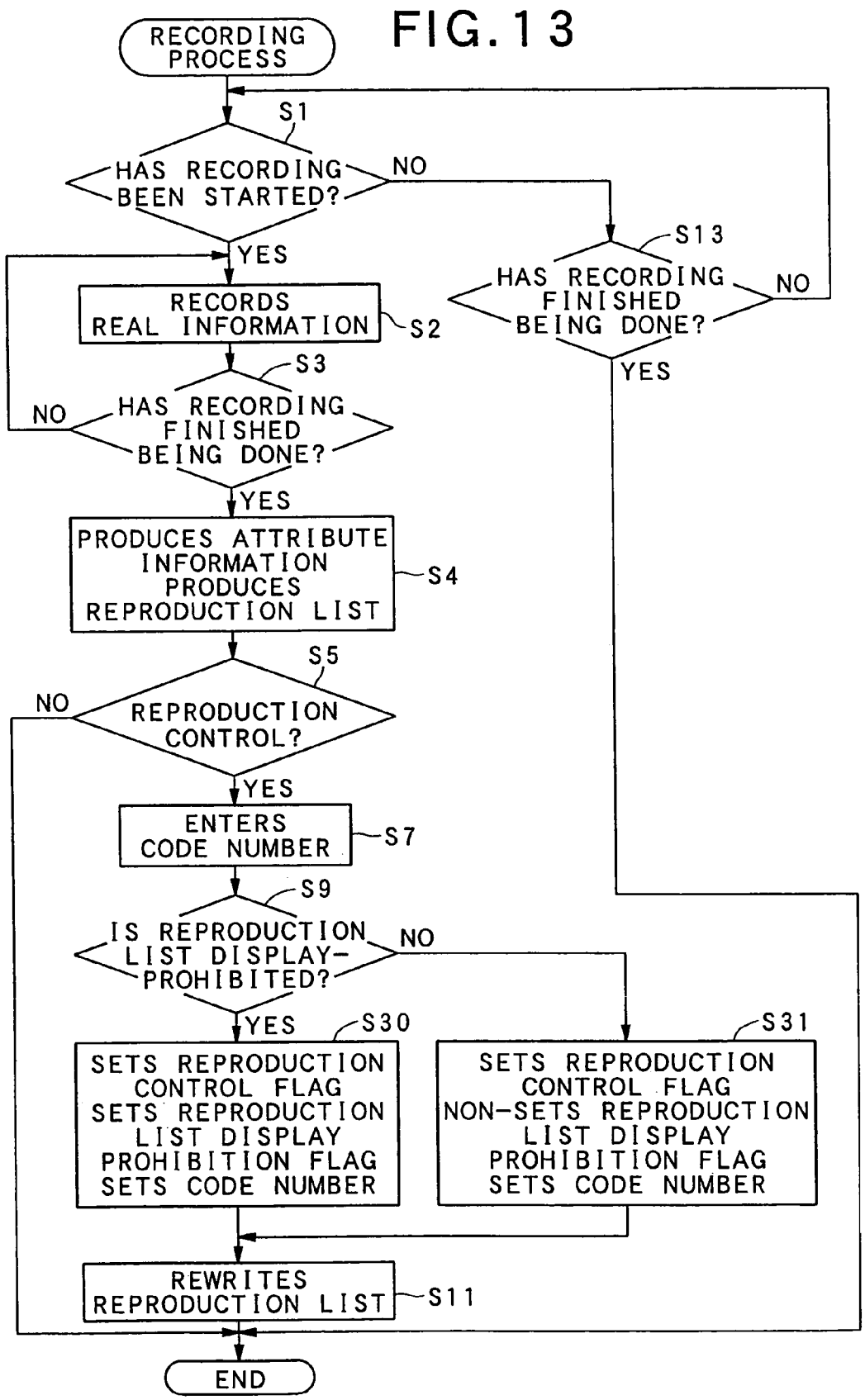
FIG. 13 is a flow chart illustrating the recording process according to the second embodiment of the present invention.

Incidentally, FIG. 13 is a flow chart illustrating this recording process. Also, in FIG. 13, the same processing operations as those in the recording process in the first embodiment illustrated in FIG. 4 are denoted by the same step numbers, and the explanation of the detail of that will be omitted.

In the recording process of the second embodiment, first, the processing operations in the steps S1, S2, S3, S4, S5, S7, and S9 are executed, thereby the recording processing of necessary real information D and the production/recording processing of necessary reproduction list PL and attribute information CI are executed. At this time, the operations of processing (steps S6 and S8) regarding the code number PIN within the general information GM such as those executed in the case of the first embodiment are not executed. Also, it results that the code number that is entered in the step S7 is the code number PPN that corresponds to only the reproduction list PL that has become an object with respect to which that code number should at that time be entered.

And, when, in the determination of the step S9, the display of the representative picture image is determined as being not the one which should be prohibited (step S9: NO), the content of the reproduction control flag PCF that should be included under the corresponding reproduction list PL is set to "1" according to the determination in the step S5, the content of the reproduction list display prohibition flag PHF that should similarly be included thereunder is set to "0", and, in addition, the above-described code number PPN (that is already entered in the step S7) that corresponds to only the reproduction list PL is set (step S31).

On the other hand, when the display of the representative picture image is the one which should be prohibited (step S9: YES), the content of the reproduction control flag PCF that should be included under the corresponding reproduction list PL is set to "1" according to the determination in the step S5, the content of the reproduction list display prohibition flag PHF that should similarly be included thereunder is set to "1", and, in addition, the above-described code number PPN that corresponds to only the reproduction list PL is set (step S30).

And, at the point in time when the content of the reproduction control flag PCF, the content of the reproduction list display prohibition flag PHF, and the code number have respectively finished being set (steps S30 and S31), there is rewritten (step S11) the content of the corresponding reproduction list PL that was theretofore recorded (step S4), thereby the series of operations for the recording process is terminated.

Next, the editing process for the real information D, etc. according to the second embodiment will be explained using FIG. 14. Incidentally, this editing process includes processing for producing a new virtual reproduction list VPL, processing for adding/recording new real information D, processing for changing the content of an existing virtual reproduction list VPL, processing for deleting part of existing real information D from the optical disc 1, etc.

Figure 14:
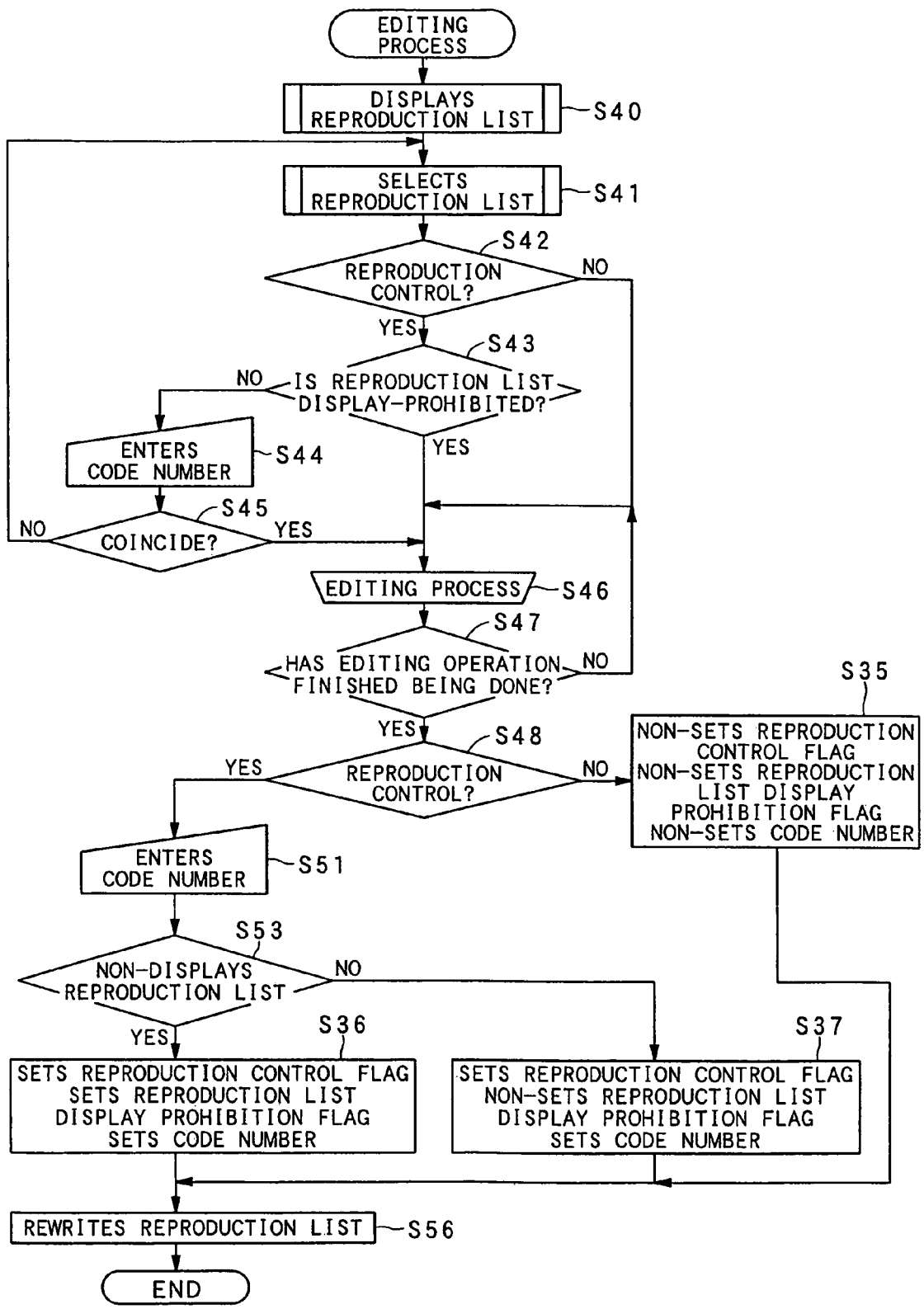
FIG. 14 is a flow chart illustrating the editing process according to the second embodiment of the present invention.

Also, FIG. 14 is a flow chart illustrating this editing process. Here, in FIG. 14, regarding the processing operations that are the same as those executed in the editing process of the first embodiment illustrated in FIG. 5, they are denoted by the same step numbers and the explanation of the detail of those is omitted.

In the editing process of the second embodiment, first, the processing operations in the steps S40 to S48 illustrated in FIG. 5 are executed, thereby necessary editing processing operations with respect to the desired reproduction list PL are executed.

And, when, in the determination in the step S48, the content of the real information D that is to be reproduced according to the post-edit reproduction list PL is not the one with respect to which reproduction control should be performed (step S48: NO), the reproduction control flag PCF in the newly produced reproduction list PL is set to "0" and simultaneously the reproduction list display prohibition flag PHF is set to "0" (step S49), and, further, setting of the corresponding code number PPN is not performed (step S35). Then, the flow proceeds to the processing of a step S56 as later described.

On the other hand, when the content of the real information D that is to be reproduced according to the post-edit reproduction list PL is the one which should be reproduction-controlled (step S48: YES), next, the display indicating that the code number PPN corresponding to only the post-edit reproduction list PL should be entered is made, for example, on the display not illustrated, etc., to thereby prompt the execution of that entry processing. When correspondingly thereto a new code number PPN has been entered (step S51), next, whether the display of the representative picture image corresponding to the produced (step S46) reproduction list PL is the one which should be prohibited in the relevant menu screen is confirmed (step S53) according to the content of the operation in the operation part 20. And when that display of the representative picture image is not the one which should be prohibited (step S53: NO), the content of the reproduction control flag PCF that should be included under the corresponding reproduction (play) list PL is set to "1" according to the determination in the step S48 and, simultaneously, the content of the reproduction list display prohibition flag PHF that should similarly be included thereunder is set to "0" and, further, the code number PPN corresponding to only the reproduction list PL alone is set (step S37).

On the other hand, when the display of that representative image is the one which should be prohibited (step S53: YES), the content of the reproduction control flag PCF that should be included under the corresponding reproduction (play) list PL is set to "1" according to the determination in the step S48 and, simultaneously the content of the reproduction list display prohibition flag PHF that should similarly be included thereunder is set to "1", and, further, the code number PPN corresponding to only the reproduction list PL alone is set (step S36).

And, at the point in time when setting the content of the reproduction control flag PCF and the content of the reproduction list display prohibition flag PHF and the code number PPN has respectively finished being performed (steps S35, S36 and S37) the content of the corresponding reproduction list PL that was recorded (step S46) is rewritten (step S56), thereby the series of processing operations for the editing process are terminated.

Next, the detail of the selection processing (step S41) of the reproduction list PL in the above-described editing process according to the second embodiment will be explained using FIG. 15. Incidentally, FIG. 15 is a flow chart illustrating the selection process of the reproduction list according to the second embodiment.

Figure 15:
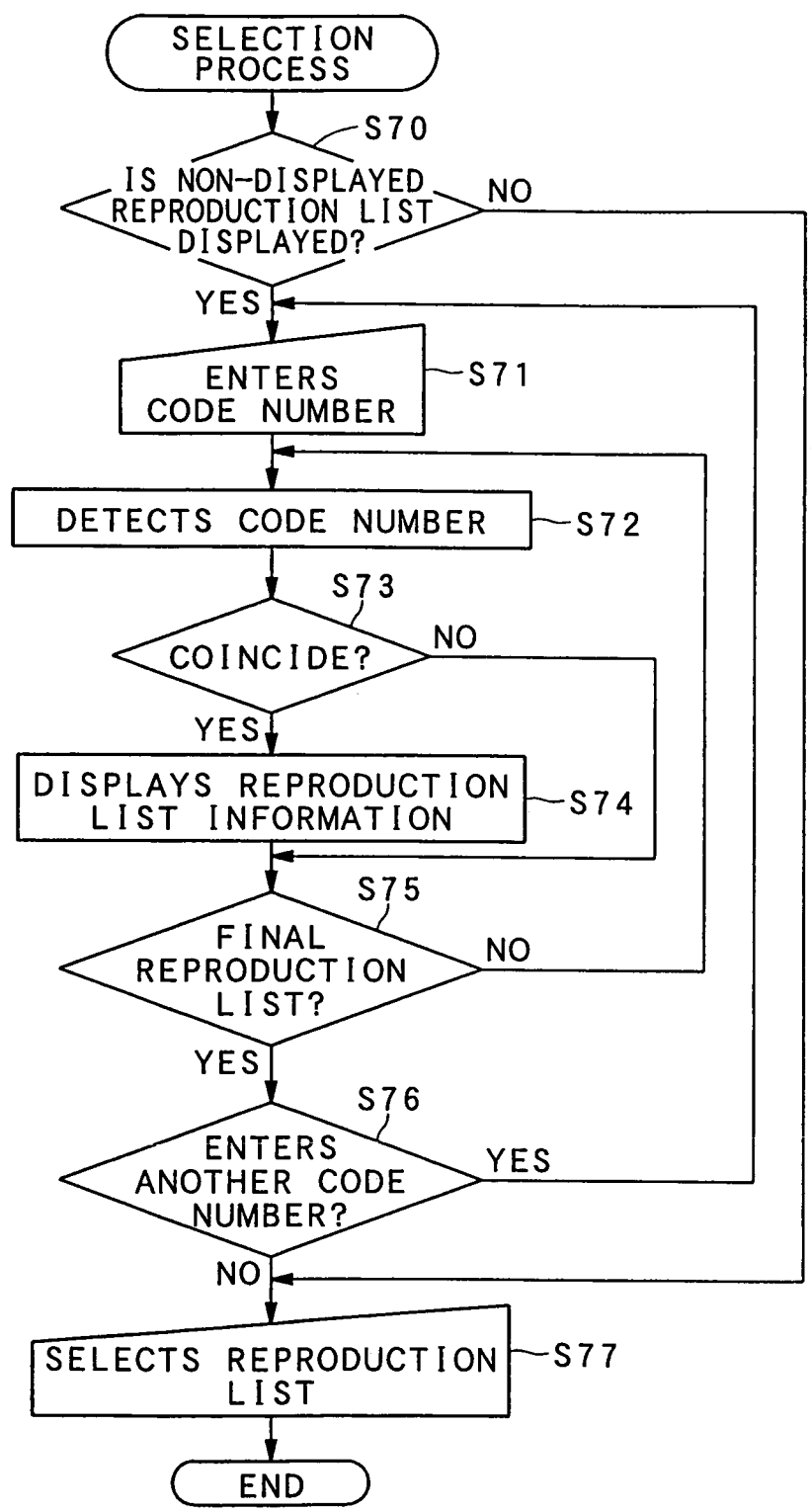
FIG. 15 is a flow chart illustrating the reproduction list selection process according to the second embodiment of the present invention.

As illustrated in FIG. 15, in the selection process of the reproduction list PL that is executed in the above-described step S41, first, when the menu screen M illustrated in FIG. 7 is displayed by the execution of the above-described step S40, next, it is confirmed (step S70) whether the operation for displaying the representative picture image SI that is determined (displayed) as being non-displayed on that menu screen M (FIG. 7A or 9A) has been performed in the operation part 20.

And, when that operation has not been done yet (step S70: NO), the selection of the reproduction list PL is performed using the representative picture image that is now being displayed (step S77), then the flow proceeds to step S42 of FIG. 14.

On the other hand, when the operation for displaying the representative picture image that is determined as being non-displayed has been operated (step S70: YES), next, for releasing the prohibition of that display, as illustrated in FIG. 7B or FIG. 9B, a field PT for entry that indicates that the code number PPN which must have been recorded every reproduction list PL is to be entered is displayed on the menu screen M to thereby prompt the execution of the entry processing. When the code number PIN corresponding to that has been entered (step S71), collation is made between that entered code number PPN and the code number PPN recorded in the corresponding reproduction list PL, and it is confirmed whether those code numbers coincide with each other (step S73). As a result of this, when the both do not coincide (step S73: NO), it is determined that the user who should not view that representative picture image is now executing the editing process. And, the flow proceeds to step S75 as is. On the other hand, when the input code number PPN and the recorded code number PPN have coincided with each other (step S73: YES), then as illustrated in FIG. 7C or FIG. 9C a corresponding representative picture image SI is newly displayed within the menu screen M. In addition, the reproduction list information such as the name, production date, etc. of the reproduction list, itself, PL is displayed, according to the necessity, by searching the interior of that reproduction list PL (step S74).

And, it is confirmed, regarding all representative picture images SI that are now being displayed in the menu screen M, whether the processing operations in the steps S72 to S74 have been executed (step S75). When the processing about all the representative picture images has not finished being executed (step S75: NO), the flow again returns to step S72, thereby the above-described steps of processing about the remaining representative picture images SI are repeated. On the other hand, when the processing about all the representative picture images SI has finished being executed (step S75: YES), next, it is confirmed whether another code number PPN is to be entered (step S76).

As a result of this, when another code number PPN is entered (step S76: YES), regarding that entered new code number PPN the processing operations in the steps S71 to S75 are repeated.

On the other hand, when no other code number PPN is input (step S76: NO), the selection processing of the reproduction list PL is executed using the representative picture image SI that is now being displayed in the menu screen M, as is, (step S77), thereafter the flow proceeds to the above-described step S42 of FIG. 14.

Incidentally, since the display process of the reproduction list PL and the reproduction process of the real information D, based on the use of the reproduction list PL, in the information recording/reproducing apparatus of the second embodiment are the same as those in the case illustrated in FIGS. 6 to 9 and FIG. 11 in the first embodiment, the explanation of that detail is omitted.

With the above-explained information recording/reproducing apparatus of the second embodiment as well, the effect the same as that attainable in the case of the first embodiment is brought about.

(III) Third Embodiment

Next, a third embodiment that is another embodiment of the present invention will be explained using FIGS. 16 to 22.

Although in the above-described first and second embodiments an explanation has been given of the case where the reproduction control flag PCF and reproduction list display prohibition flag PHF are disposed in the respectively separate zones, the third and fourth embodiments that will be explained below are each the embodiment in the case where only the reproduction control flag PCF is used in the way of being used concurrently as each of those two flags.

Incidentally, in the FIGS. 16 to 22 that will be explained below, the same members in their corresponding figures that were used in the explanation about the first embodiment are denoted by the same member numerals with their detailed explanation being omitted.

Also, since the construction of the information recording/reproducing apparatus according to the third embodiment is the same as that of the information recording/reproducing apparatus S according to the first embodiment illustrated in FIG. 2, the explanation of that detail is omitted.

(A) Embodiment of the Recording Format

Initially, before concretely explaining the construction, etc. of the information recording/reproducing apparatus according to the third embodiment, the recording format that is used when recording information with respect to the optical disc 1 by the information recording/reproducing apparatus according to the third embodiment will be explained using FIG. 16. Incidentally, FIG. 16 is a view illustrating the recording format (physical format) of the respective information according to the third embodiment.

As described above, in the recording format of the third embodiment, the reproduction control flag PCF is also made to have the meaning as that of the reproduction list display prohibition flag PHF, and therefore in the recording format in the third embodiment the reproduction list display prohibition flag PHF does not exist.

Figure 16:
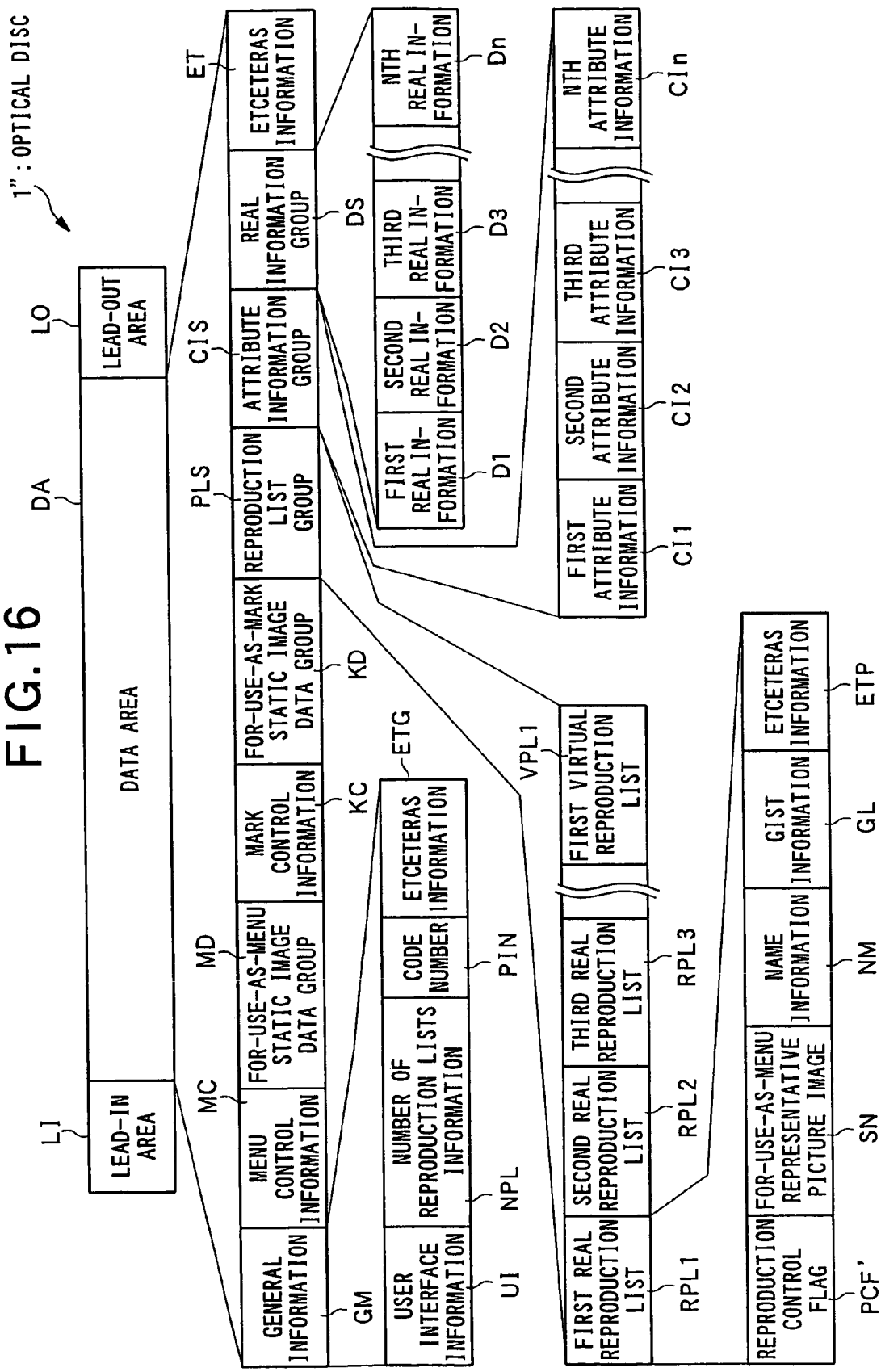
FIG. 16 is a view illustrating a recording format according to a third embodiment of the present invention.

Namely, as illustrated in FIG. 16, in the recording format in the third embodiment, as the respective reproduction list PL, in addition to the for-use-as-menu representative picture image SN, name information NM, gist information GL, and etceteras information ETP, a reproduction control flag PCF' having the meaning as that of the reproduction list display prohibition flag PHF, as well, is recorded.

At this time, as the contents of the reproduction control flag PCF', in more detail, when the content of the real information D that is to be reproduced according to the reproduction list PL included under the reproduction control flag PCF' is the one which should be reproduction-controlled, the reproduction control flag PCF' is set to "1" by simultaneously making a determination of that the display of the reproduction list, itself, PL under which the reproduction control flag PCF' is included should also be prohibited in the menu screen M, while, when that real information D is not the one which should be reproduction-controlled, the reproduction control flag PCF' is set to "0" by simultaneously making a determination of that the display of the reproduction list, itself, PL should not be prohibited in the menu screen M.

Incidentally, since the other construction of the recording format according to the third embodiment is the same as that of the recording format of the first embodiment, the explanation of that detail is omitted.

(B) Embodiment of the Construction and Operation of the Information Recording/Reproducing Apparatus Next, the operation of the information recording/reproducing apparatus according to the third embodiment will be explained using FIGS. 17 to 22.

First of all, the recording process of the real information D, etc. according to the third embodiment will be explained using FIG. 17.

Figure 17:
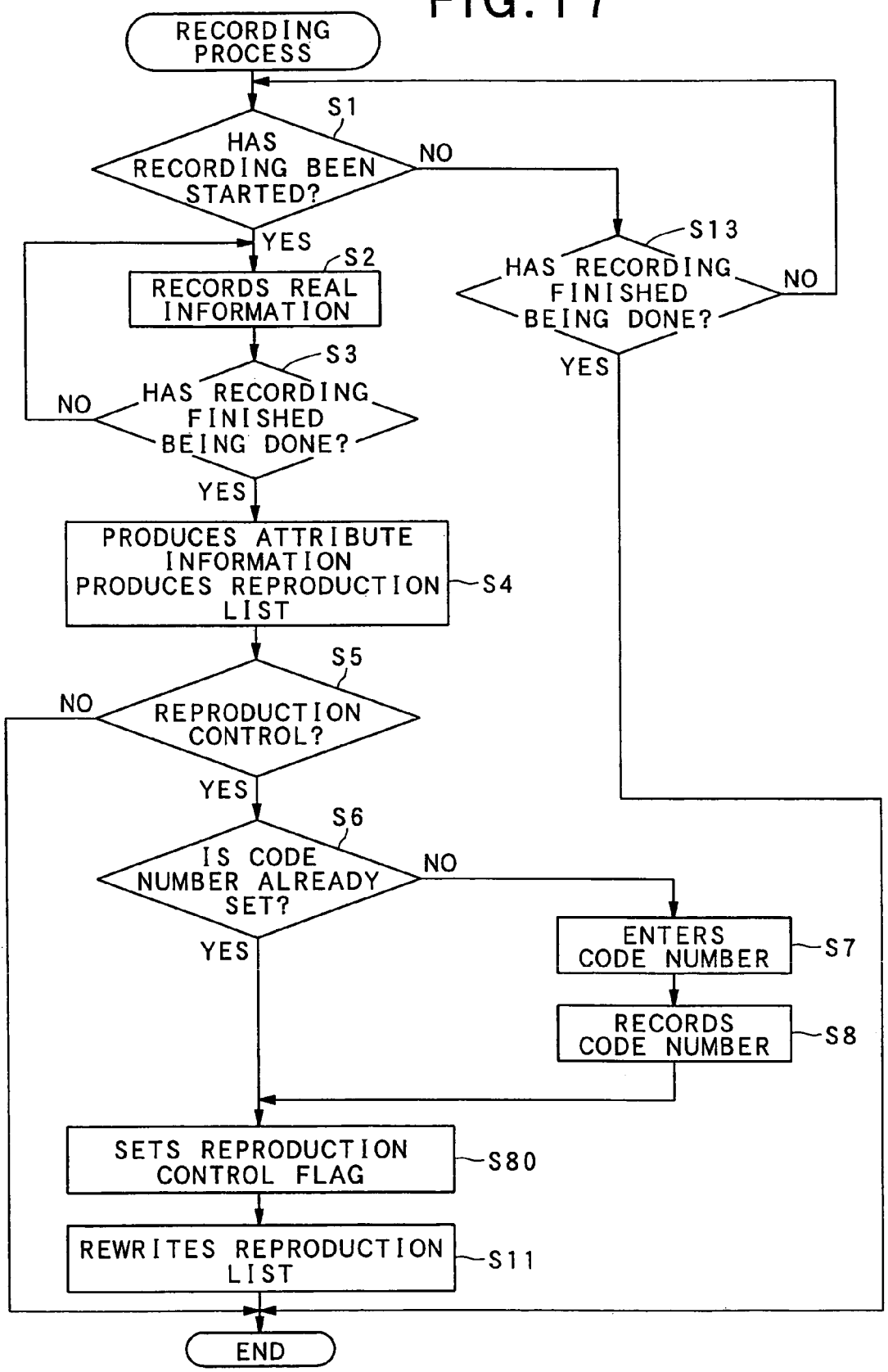
FIG. 17 is a flow chart illustrating the recording process according to the third embodiment of the present invention.

Incidentally, FIG. 17 is a flow chart illustrating the recording process. Also, in FIG. 17, the same operations of processing as those in the recording process of the first embodiment illustrated in FIG. 4 are denoted by the same step numerals with their detailed explanation being omitted.

In the recording process of the third embodiment, first, the processing operations in the steps S1 to S8 illustrated in FIG. 4 are executed, whereby, recording processing of necessary real information S, production/recording processing of necessary reproduction list PL and attribute information CI, and recording processing of the code number PIN that is common to the optical disc 1 as a whole are executed. At this time, the processing regarding the reproduction list display prohibition flag PHF, such as that (step S9) executed in the first embodiment, is not executed.

And, when in the determination of the step S6 the code number PIN is already recorded (step S6: YES), next, for limiting the reproduction processing of the real information D based on the use of the produced (step S4) reproduction list PL the content of the corresponding reproduction limit flag PCF is set to "1" (step S80) and, further, the content of the corresponding reproduction list PL that was already recorded (step S4) at that point in time is rewritten (step S11). Then, the series of recording processing operations are terminated.

Figure 18:
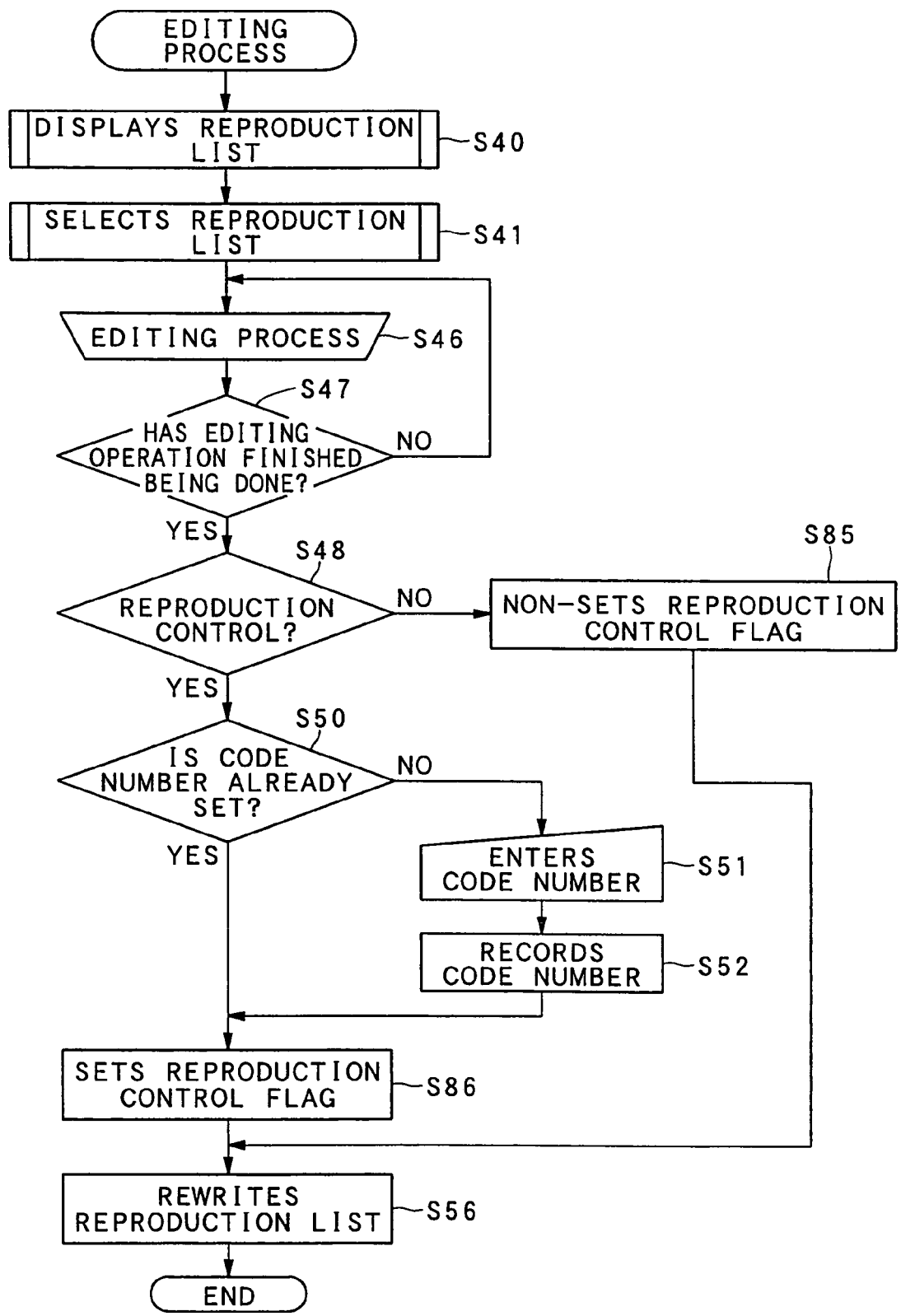
FIG. 18 is a flow chart illustrating the editing process according to the third embodiment of the present invention.

Next, the concrete operation of the editing process for the real information D, etc. which is executed in accordance with the recording format illustrated in FIG. 16 through the operation of the above-constructed information recording/reproducing apparatus will be explained using FIG. 18. Incidentally, FIG. 18 is a flow chart illustrating the editing process for the real information D according to the third embodiment that is executed mainly according to and from the CPU 17. The same steps of processing as those executed in the editing process according to the first embodiment illustrated in FIG. 5 are denoted by the same step numbers and the explanation of their detail is omitted.

In the editing process, initially, while it is having executed with respect thereto control processing such as prohibition of the display through the execution of the processing operations as later described in detail, the representative picture image corresponding to the respective reproduction list PL recorded in the optical disc 1 is displayed on the display not illustrated (step S40) and, by selecting the desired one from among those representative picture image that are displayed, selection of the reproduction list PL that is to be edited is made (step S41).

When the reproduction list PL is selected, then, next, the same processing operations as those in the steps S46 to S48 and steps S50 to S52 illustrated in FIG. 5 are executed.

At this time, when, in the determination of the step S48, the content of the real information D that is to be reproduced according to the post-edit reproduction list PL is not the one with respect to which reproduction control should be performed (step S48: NO), only the processing alone of setting the reproduction control flag PCF in that newly produced reproduction list PL to "0" is executed (step S85), then the flow proceeds to the processing in the step S56 illustrated in FIG. 5.

Also, when, in the determination of the step S50, the code number PIN is already recorded (step S50: YES), next, only the processing alone, of setting the content of the reproduction control flag PCF', which should be included under the corresponding reproduction list PL, to "1" is executed according to the determination in the step S48 (step S86).

And, the content of the corresponding reproduction list PL that was already recorded (step S56) at the point in time when setting of the content of the reproduction control flag PCF' has finished being done (steps S85 and S86) is rewritten (step S56), thereafter the series of editing processing operations are terminated.

Next, the detail of the display process (step S40) for the representative picture image corresponding to the reproduction list PL in the above-described editing process will be explained using FIG. 19.

Figure 19:
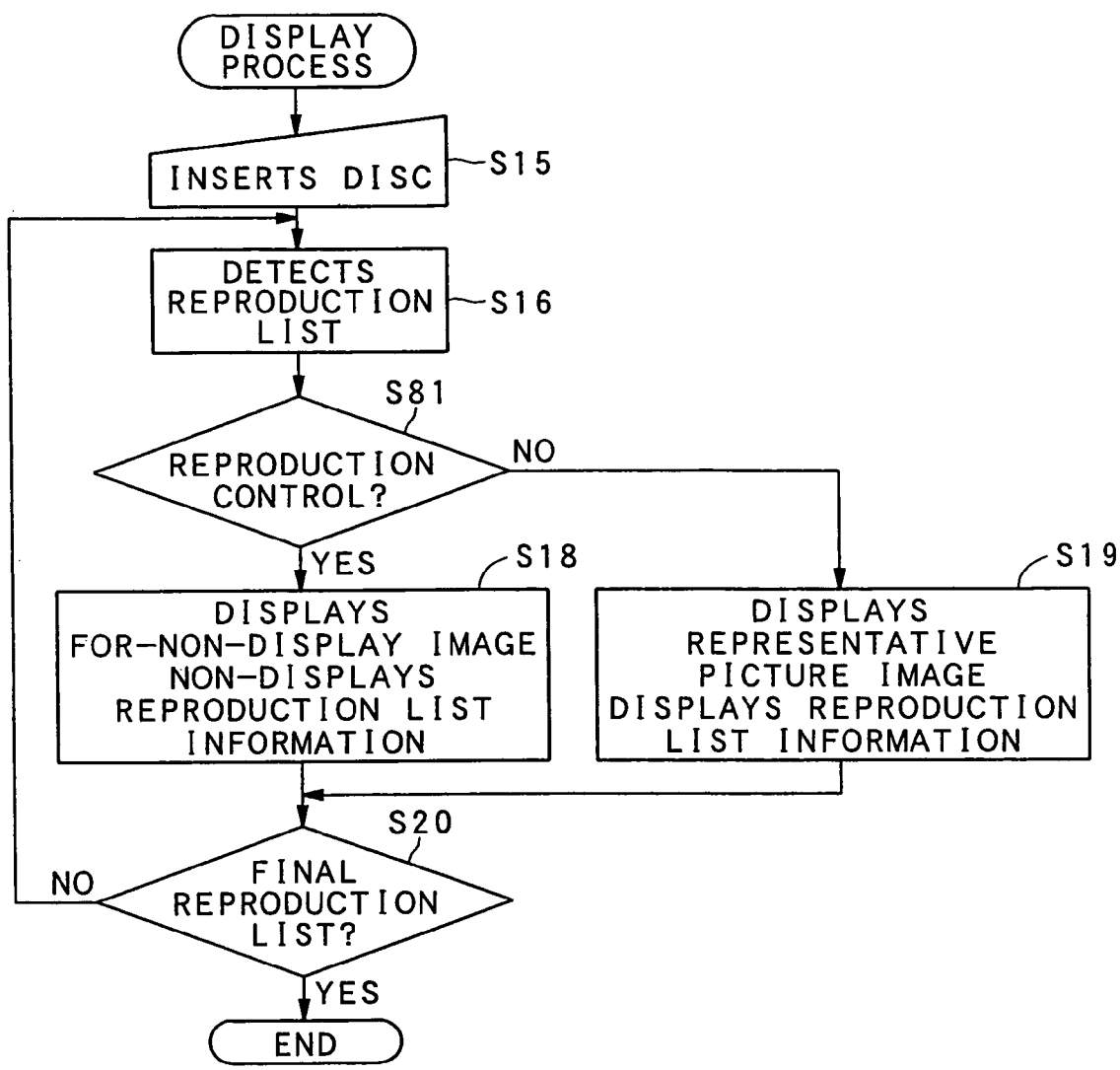
FIG. 19 is a flow chart illustrating the reproduction list display process according to the third embodiment of the present invention.

Incidentally, FIG. 19 is a flow chart illustrating the display process for the reproduction list according to the third embodiment and the same operations of processing as those executed in the display process according to the first embodiment illustrated in FIG. 6 are denoted by the same step numbers and the explanation of their detail is omitted.

As illustrated in FIG. 19, in the display process for the representative picture image in the step S40, first, the same steps of processing operations as those in the steps S15 and S16 illustrated in FIG. 6 are executed.

And, whether, regarding each of the real information D corresponding to the respective reproduction list PL that has been detected in step S16, the reproduction processing of that real information D is limited is determined by confirming the content of the reproduction control flag PCF' in that respective reproduction list PL (step S81).

And, when the corresponding real information D is the one with respect to which reproduction limitation is not done (step S81: NO), the same steps of processing as those in the steps S19 and S20 illustrated in FIG. 6 are executed, then the flow proceeds to the step S41 of FIG. 18.

On the other hand, when that corresponding real information D is the one with respect to which reproduction limitation should be performed (step S81: YES), the same operations of processing as those in the steps S18 and S20 illustrated in FIG. 6 are executed, then the flow proceeds to the step S41 of FIG. 18.

Figure 20:
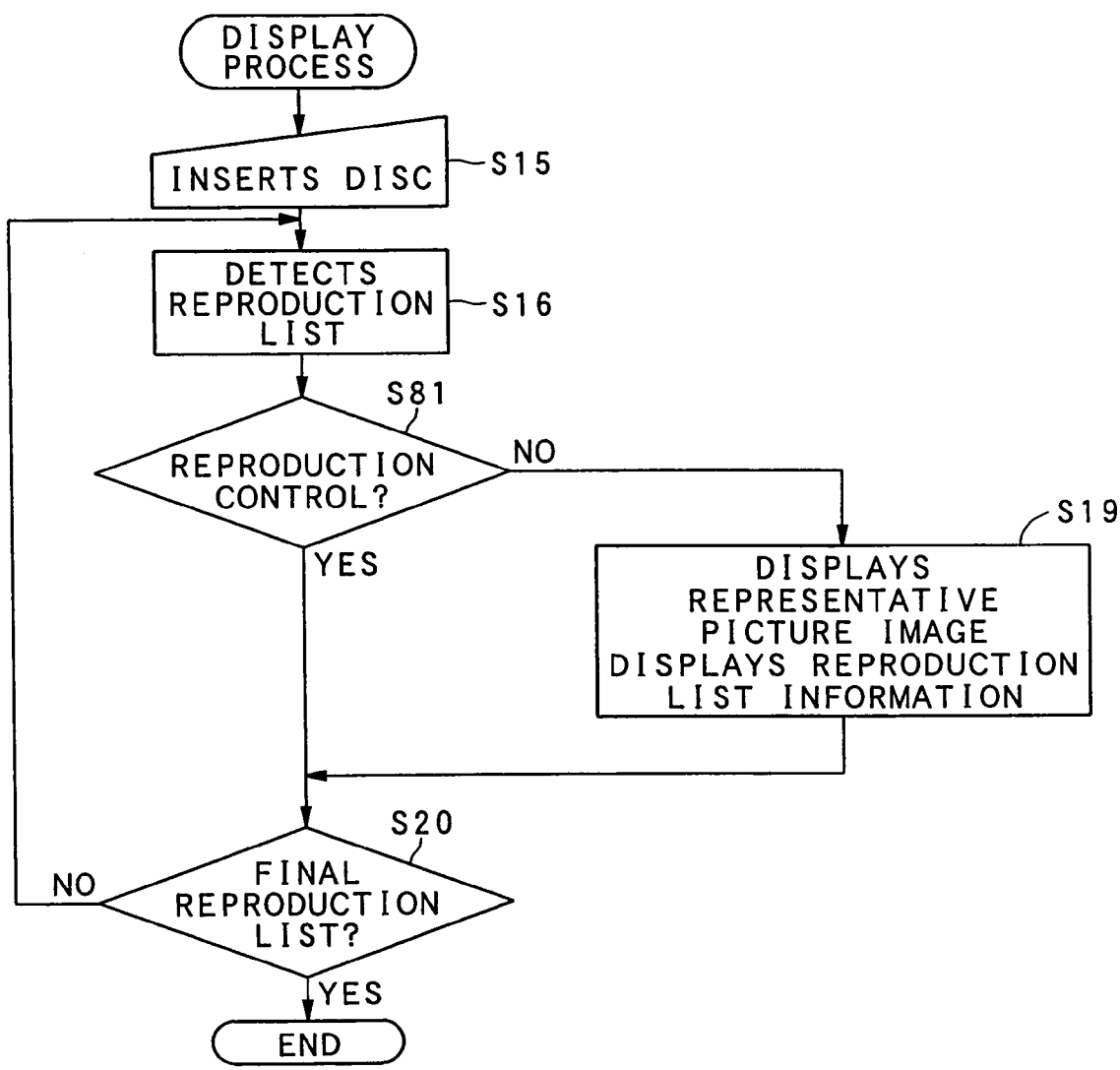
FIG. 20 is a flow chart (II) illustrating the reproduction list display process according to the third embodiment of the present invention.

Incidentally, although, in the display process illustrated in FIG. 19, regarding the representative picture image the display of which is prohibited measure has been taken of displaying, in place of that image, the for-non-display image SSI illustrated in FIG. 7A, other than this the following measure may also be taken. Namely, as illustrated in FIG. 20, regarding the reproduction list PL the corresponding representative picture image to which is display-prohibited, any image is not displayed at all at that corresponding position (see FIG. 8A) and only the representative picture image the display of which is permitted is displayed (step S19).

Next, the detail of the selection processing (step S41) for the reproduction list PL in the above-described editing process will be explained using FIG. 21. Incidentally, FIG. 21 is a flow chart illustrating the selection process for the reproduction list according to the third embodiment and the same operations of processing as those executed in the selection process according to the first embodiment illustrated in FIG. 10 are denoted by the same step numbers and the explanation of their detail is omitted.

Figure 21:
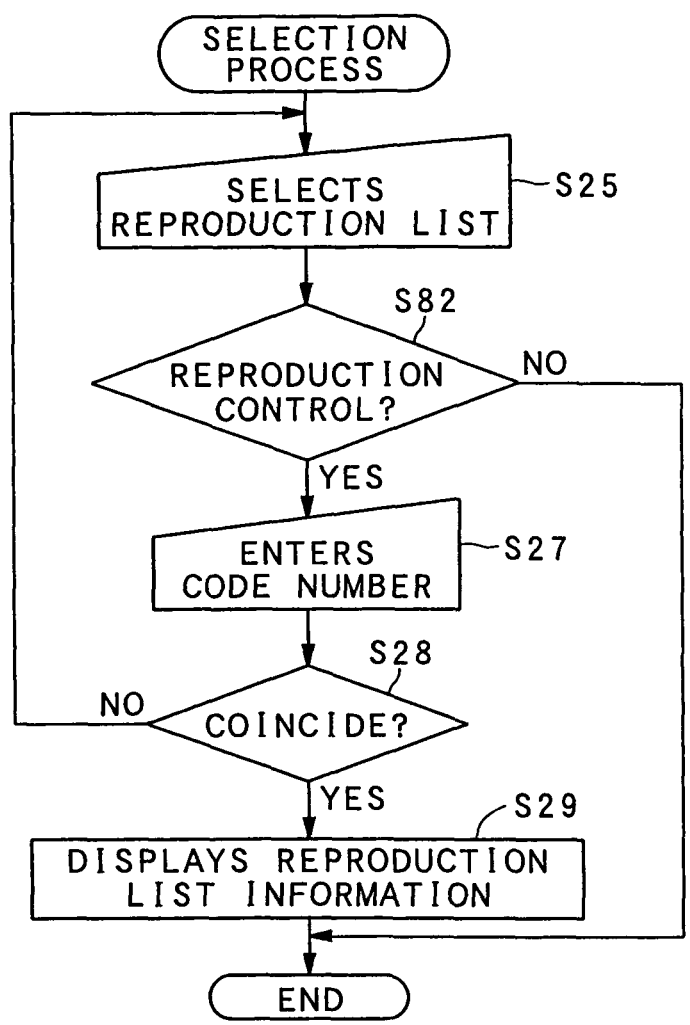
FIG. 21 is a flow chart illustrating the reproduction list selection process according to the third embodiment of the present invention.

As illustrated in FIG. 21, in the selection processing for reproduction list PL in the step S41, first, when the menu screen M illustrated in FIG. 7 is displayed through the execution of the step 40 processing, next, the processing of selecting the reproduction list PL the representative picture image of which is displayed in the menu screen M is executed in the operation part 20 (step S25). Next, regarding the real information D corresponding to the thus-selected reproduction list PL, whether the reproduction processing of that is limited is determined (step S82) by confirming the content of the reproduction control flag PCF' in the reproduction list PL.

And, in a case where that reproduction list PL is the one with respect to which reproduction processing is not limited (step S82: NO), the flow proceeds to the step S42 as is, whereas, in a case where that reproduction list PL is the one with respect to which reproduction processing is limited (step S82: YES), next, the same operations of processing as those executed in the steps S27 to S29 illustrated in FIG. 10 are executed, then the flow proceeds to the step S42.

Figure 22:
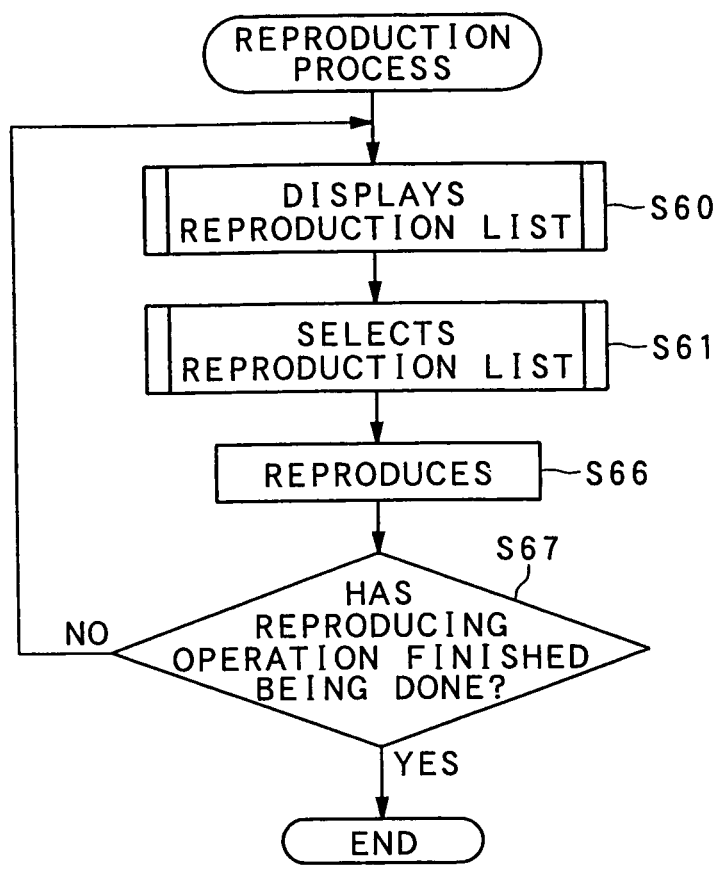
FIG. 22 is a flow chart illustrating the reproduction process according to the third embodiment of the present invention.

Finally, the concrete operation of the reproduction process for the real information D, etc. which is executed from the optical disc 1 in accordance with the recording format illustrated in FIG. 16 through the operation of the above-constructed information recording/reproducing apparatus will be explained using FIG. 22. Incidentally, FIG. 22 is a flow chart illustrating the reproduction process for the real information D according to the third embodiment that is executed mainly according to and from the CPU 17. The same operations of processing as those executed in the reproduction process according to the first embodiment illustrated in FIG. 11 are denoted by the same step numbers and the explanation of their detail is omitted.

As illustrated in FIG. 22, as the reproduction process, first, the display process (step S60) for reproduction list PL and the selection process (step S61) therefor that are the same as those in the editing process illustrated in FIG. 18 are executed.

Here, in a case where, as in the third embodiment, a setting is made of that when the reproduction list PL is the one which should be reproduction-limited the corresponding representative picture image is simultaneously not displayed either, there can occur no state where in that step S61 the code number PIN is entered and, on the other hand, the reproduction limitation is still made although that representative picture image is not displayed, and, therefore, after selecting that reproduction list PL (step S61), the reproduction processing of the corresponding real information D from the optical disc 1 is immediately executed (step S66).

And, further, whether reproduction up to the final real information D that is to be reproduced has finished being performed is confirmed (step S67).

And, when reproduction process up to the final reproduction list PL has not finished being performed (step S67: NO), the flow returns to the step S60 so as to select the reproduction list PL that includes the real information D that is to be reproduced next. On the other hand, when reproduction process up to the final reproduction list PL that is to be reproduced has already finished being performed (step 67: YES), the CPU 17 terminates the reproduction process according to the first embodiment as is.

As described above, according to the operation of the information recording/reproducing apparatus according to the third embodiment, since the reproduction control flag PCF' has two ways of meaning one of which represents whether prohibiting the display of the representative picture image and the other of which represents whether limiting the reproduction processing, itself, of the real information D corresponding to the reproduction list PL, in addition to the effect resulting from the operation of the information recording/reproducing apparatus S according to the first embodiment the effect of enabling preventing the content of the real information D corresponding to the reproduction list PL from being inadvertently recognized by the user is also brought about by limiting the display of the representative picture image, and also limiting the reproduction processing of the real information D corresponding to the reproduction list PL, according to that reproduction control flag PCF'.

(IV) Fourth Embodiment

Finally, a fourth embodiment which is another embodiment of the present invention will be explained using FIGS. 23 to 25.

Although in the above-described third embodiment the code number PIN is recorded within the general information GM as being common to all the real information D, or reproduction lists PL, that are recorded in the optical disc 1, in the fourth embodiment explained below a specific code number is set every reproduction list PL. Further, the reproduction control flag PCF' according to the fourth embodiment also has two ways of meaning the same as those in the case of the third embodiment.

Incidentally, in FIGS. 23 to 25 explained below, the same members as those in the corresponding figures that were used in the explanation in connection with the first or third embodiment are denoted by the same reference symbols, and the explanation of their detail is omitted.

Also, since the construction of the information recording/reproducing apparatus according to the fourth embodiment is the same as that of the information recording/reproducing apparatus S according to the first embodiment illustrated in FIG. 2, the explanation of that detail is omitted.

(A) Embodiment of the Recording Format

Initially, before concretely explaining the construction, etc. of the information recording/reproducing apparatus according to the fourth embodiment, the recording format that is used when recording information with respect to the optical disc 1 by using the information recording/reproducing apparatus according to the fourth embodiment will be explained using FIG. 23. Incidentally, FIG. 23 is a view illustrating the recording format (physical format) for the respective information according to the fourth embodiment.

Since, as described above, in the recording format of the fourth embodiment, a specific code number is recorded in corresponding relationship to each of the respective reproduction lists, that code number is recorded not within the general information GM region but within the respective reproduction list PL region.

Figure 23:
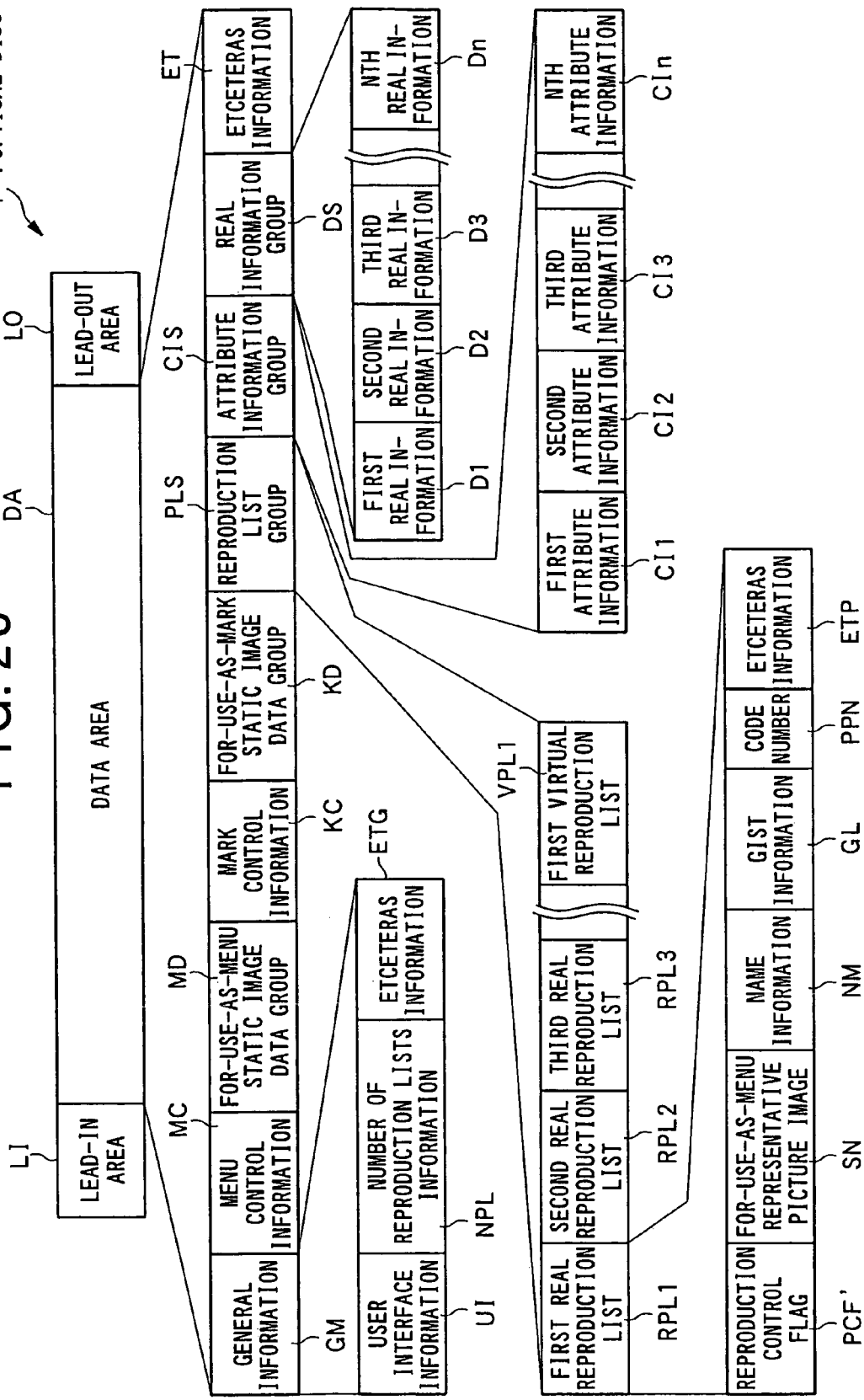
FIG. 23 is a view illustrating a recording format according to a fourth embodiment of the present invention.

Namely, as illustrated in FIG. 23, in the recording format according to the fourth embodiment, the general information GM is constructed of only the user interface information UI, reproduction lists number information NPL, and etceteras information ETG, alone, which are the same as those illustrated in FIG. 16. On the other hand, the respective reproduction list PL has recorded therein a code number PPN different for each reproduction list PL in addition to the reproduction control flag PCF', for-use-as-menu representative picture image SN, name information NM, gist information GL, and etceteras information ETP which are the same as those illustrated in FIG. 16.

Incidentally, since the other construction of the recording format in the fourth embodiment is the same as that of the recording format in the third embodiment illustrated in FIG. 16, the explanation of that detail is omitted.

(B) Embodiment of the Construction and Operation of the Information Recording/Reproducing Apparatus Next, the operation of the information recording/reproducing apparatus according to the fourth embodiment will be explained using FIGS. 24 and 25.

First, the recording process for the real information D, etc. according to the fourth embodiment will be explained using FIG. 24.

Figure 24:
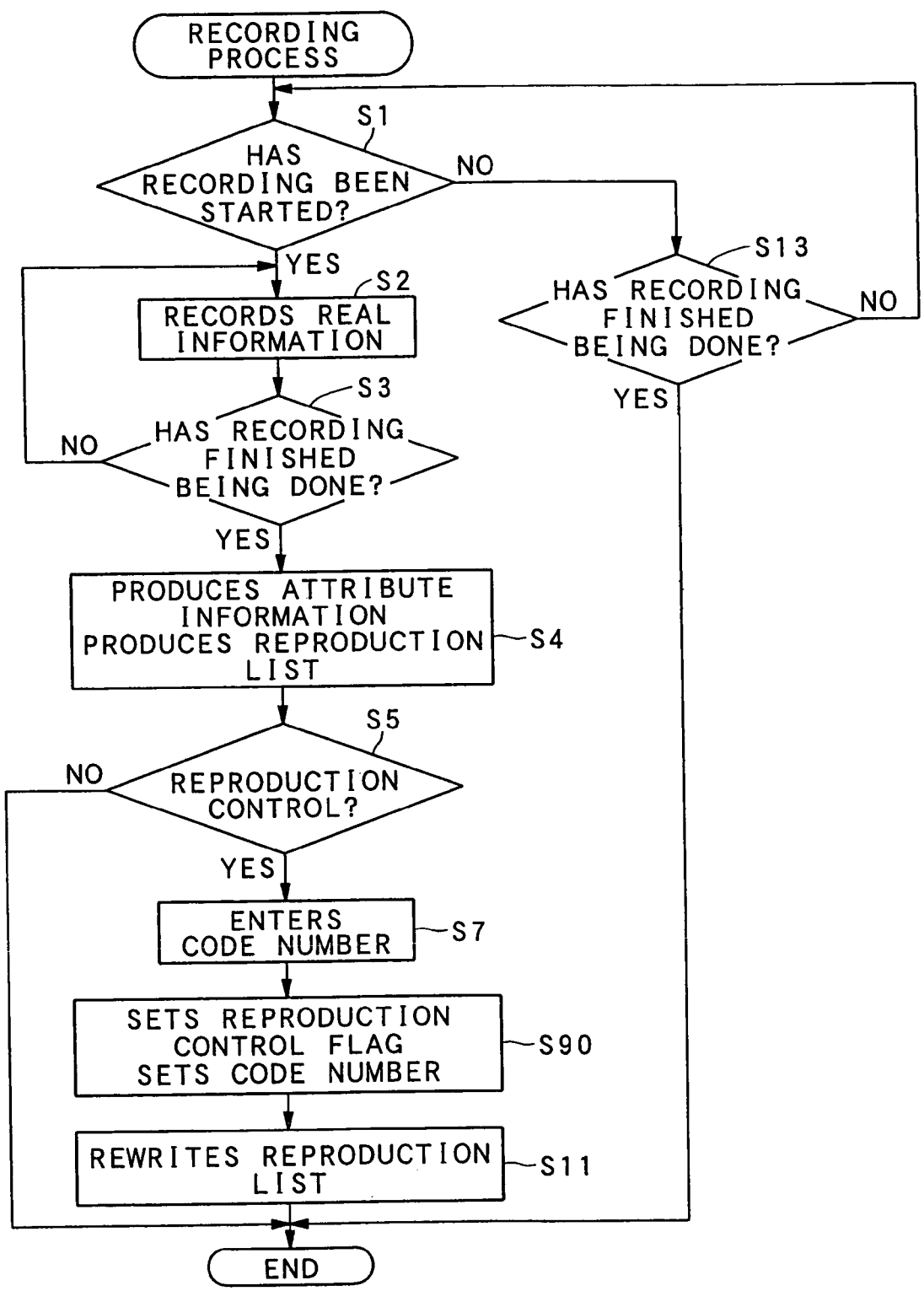
FIG. 24 is a flow chart illustrating the recording process according to the fourth embodiment of the present invention.

Incidentally, FIG. 24 is a flow chart illustrating that recording process, and the same operations of processing as those in the recording process according to the third embodiment illustrated in FIG. 17 are denoted by the same step numbers and the explanation of those details is omitted.

In the recording process of the fourth embodiment, first, the processing operations in the steps S1, S2, S3, S4, S5, and S7 are executed, thereby the recording processing of necessary real information D and the production/recording processing of necessary reproduction list PL and attribute information CI are executed. At this time, the processing operations (steps S6 and S8) regarding the code number PIN within the general information GM such as those executed in the case of the third embodiment are not executed. Also, it results that the code number that is entered in the step S7 is the code number PPN that corresponds to only the reproduction list PL, alone, that has become an object with respect to which that code number should at that time be entered.

And, when the entry of the code number PPN has finished being done, the content of the reproduction control flag PCF' that should be included under the corresponding reproduction list PL is set to "1" according to the determination in the step S5, and, in addition, the above-described code number PPN (that is already entered in the step S7) that corresponds to only the reproduction list PL alone is set (step S90).

And, at the point in time when the content of the reproduction control flag PCF, and the code number PPN, have respectively finished being set (step S90), there is rewritten (step S11) the content of the corresponding reproduction list PL that was theretofore recorded (step S4), thereby the series of recording processing operations are terminated.

Next, the editing process for the real information D, etc. according to the fourth embodiment will be explained using FIG. 25. Incidentally, this editing process includes processing for producing a new virtual reproduction list VPL, processing for adding/recording new real information D, processing for changing the content of an existing virtual reproduction list VPL, processing for deleting part of existing real information D from the optical disc 1, etc.

Figure 25:
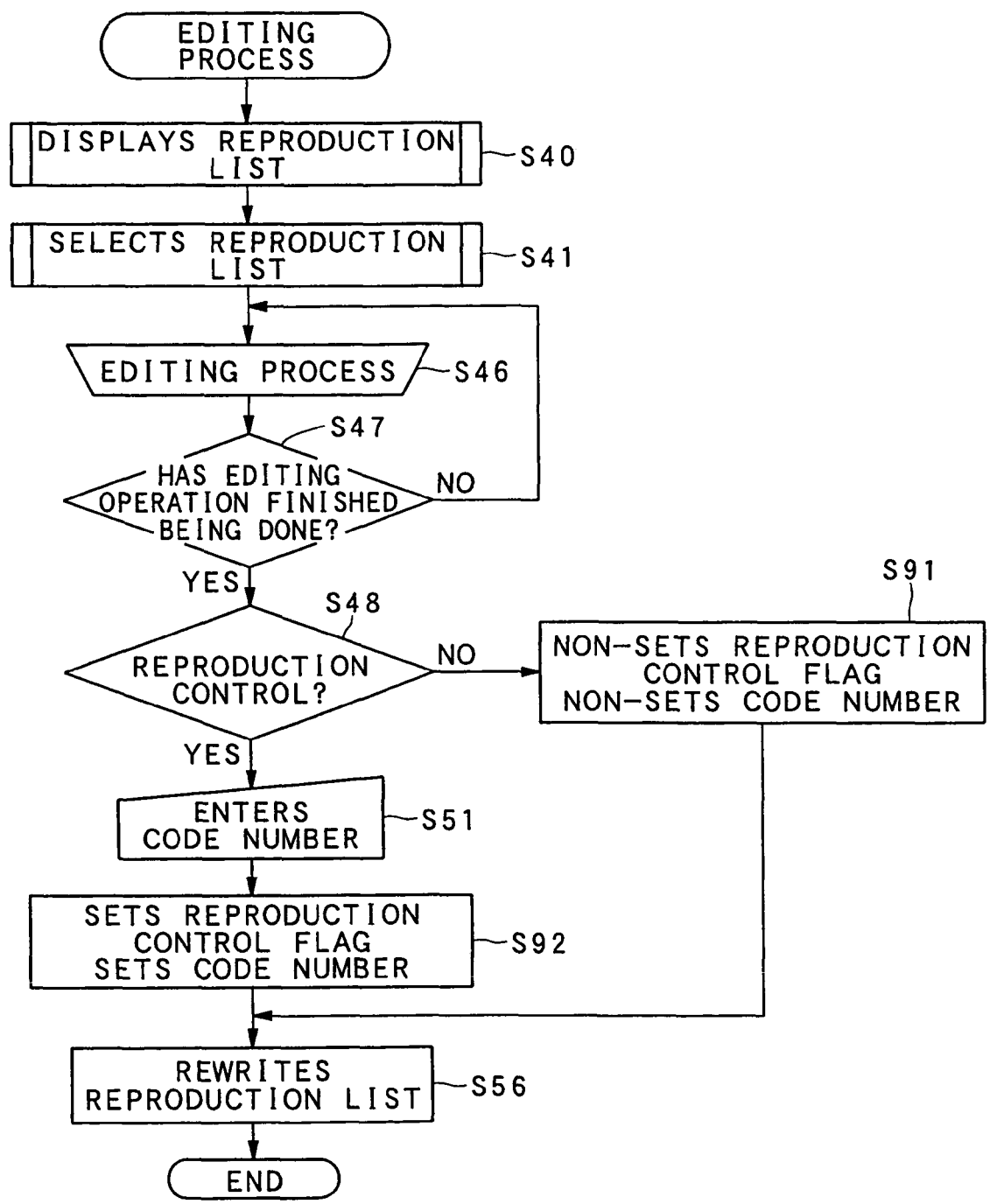
FIG. 25 is a flow chart illustrating the editing process according to the fourth embodiment of the present invention.

Also, FIG. 25 is a flow chart illustrating this editing process. Regarding the processing operations that are the same as those executed in the editing process of the third embodiment illustrated in FIG. 18, they are denoted by the same step numbers and the explanation of the detail of those is omitted.

In the editing process of the fourth embodiment, first, the processing operations in the steps S40 and S41 and S46 to S48 illustrated in FIG. 18 are executed, thereby necessary editing processing operations with respect to the desired reproduction list PL are executed.

And, when, in the determination in the step S48, the content of the real information D that is to be reproduced according to the post-edit reproduction list PL is not the one with respect to which reproduction control should be performed (step S48: NO), the reproduction control flag PCF in the newly produced reproduction list PL is set to "0" and, further, setting of the corresponding code number PPN is not performed (step S91). Then, the flow proceeds to the processing of the step S56 as later described.

On the other hand, when the content of the real information D that is to be reproduced according to the post-edit reproduction list PL is not the one which should be reproduction-controlled (step S48: YES), next, the display indicating that the code number PPN corresponding to only the post-edit reproduction list PL should be entered is made, for example, on the display not illustrated, etc., to thereby prompt the execution of that entry processing. When correspondingly thereto a new code number PPN has been entered (step S51), next, the content of the reproduction control flag PCF that should be included under the reproduction (play) list PL that was produced (step S46) is set to "1" according to the determination in the step S48 and; simultaneously, the code number PPN corresponding to only the reproduction list PL alone is set (step S92).

And, at the point in time when setting the content of the reproduction control flag PCF and the code number PPN has respectively finished being performed (steps S91 and S92), the content of the corresponding reproduction list PL that was theretofore recorded (step S46) is rewritten (step S56), thereby the series of editing processing operations are terminated.

Incidentally, since the display process for reproduction list PL, selection process therefor, and reproduction process for the real information D based on the use of the reproduction list PL, which are executed in the information recording/reproducing apparatus according to the fourth embodiment, are the same as those in the case of the third embodiment illustrated in FIGS. 19 to 22, the explanation of those details is omitted.

With the above-explained information recording/reproducing apparatus of the fourth embodiment, as well, the same effect as that attainable in the case of the third embodiment can be brought about.

Incidentally, although in each of the above-described respective embodiments not only the representative picture image SI but also the name, production time and date, etc. of the reproduction list, itself, PL have been illustrated as the things indicating the reproduction list PL that is displayed on the menu screen M, other than this there may be also included as such things letter information indicating the gist of the content of the real information D that is reproduced according to the reproduction list PL.

Further, although in each of the above-described respective embodiments an explanation has been given of the case where the data area DA exists only one piece within the optical disc 1, other than this it is also possible to construct in the way in which a plurality of different data areas are provided and, for each data area, the real information D is recorded separately and independently from that in another. And, in this case, in the first and third embodiment, for each data area, it is also possible to construct in the way in which, regarding only the real information D, etc., alone, within that data area, a common code number PIN is set.

Further, by keeping stored in an information recording medium such as a flexible disc the programs corresponding to the above-described respective flow charts, or keeping them distributed via the network such as the Internet, and reading them out and executing them by a general microcomputer, or the like, this general microcomputer, or the like can also be made to function as the CPU 17 according to the respective embodiment of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-374947 filed on Dec. 7, 2001 including the specification, claims, drawings and summary is incorporated herein by reference in its entirety.

What is claimed is:

1. An information reproducing apparatus for reproducing reproduction information from a recording medium includes a plurality of pieces of reproduction information, a plurality of reproduction lists and a plurality of pieces of content information, each of the plurality of reproduction lists including different presentation control information which at least indicates whether or not a presentation of a piece of content information is limited, wherein the plurality of reproduction lists are adapted for controlling a manner of reproduction that is executed when reproducing the plurality of pieces of the reproduction information, and include a plurality of real reproduction lists corresponding to the plurality of pieces of the reproduction information, and a plurality of virtual reproduction lists for reproducing a part of the plurality of pieces of the reproduction information beyond a section of each piece of the reproduction information, a part of the plurality of pieces of the reproduction information corresponding to the real reproduction lists are able to be part of the plurality of pieces of the reproduction information corresponding to the virtual reproduction lists, wherein the content information indicates a content of a piece of the reproduction information that is be reproduced prior to the reproduction information, and is a representative image information corresponding to each of the plurality of pieces of the reproduction information which are controlled to be reproduced based on each of the reproduction lists, and wherein the information reproducing apparatus comprises a controlling device that presents, instead of the presentation of the piece of content information, prohibited reproduction list presence information which indicates the presence of the reproduction list corresponding to the piece of the content information to which the presentation is limited, when the presentation control information indicates that the presentation should be limited.

2. The information reproducing apparatus according to claim 1, wherein each piece of the content information is the representative image information corresponding to a representative image representing a content of the corresponding reproduction list, and wherein the prohibited reproduction list presence information is alternative image information corresponding to an alternative image which makes a content of the representative image unrecognizable.

3. The information reproducing apparatus according to claim 2,
wherein the information reproducing apparatus further comprises a selecting device for selecting the alternative image being displayed when the alternative image is displayed,
wherein the controlling device displays input prompting information when the alternative image is selected, the input prompting information having a content for prompting an input of canceling information to cancel the limitation of the presentation.

4. The information reproducing apparatus according to claim 1,
wherein each piece of the content information is the representative image information corresponding to a representative image representing a content of the corresponding reproduction list, and
wherein the prohibited reproduction list presence information is information which should be displayed at a location where the representative image whose presentation is limited should be displayed.

5. The information reproducing apparatus according to claim 4,
wherein the information reproducing apparatus further comprises a selecting device for selecting the prohibited reproduction list presence information being displayed when the prohibited reproduction list presence information is displayed, and
wherein the controlling device displays input prompting information when the prohibited reproduction list presence information is selected, the input prompting information having a content for prompting an input of canceling information to cancel the limitation of the presentation.

6. An information reproducing method for reproducing reproduction information from a recording medium which includes a plurality of pieces of reproduction information, a plurality of reproduction lists and a plurality of pieces of content information, each of the plurality of reproduction lists including different presentation control information which at least indicates whether or not a presentation of a piece of content information is limited,
wherein the plurality of reproduction lists are adapted for controlling a manner of reproduction that is executed when reproducing the plurality of pieces of the reproduction information, and include a plurality of real reproduction lists corresponding to the plurality of pieces of the reproduction information, and a plurality of virtual reproduction lists for reproducing a part of the plurality of pieces of the reproduction information beyond a section of each piece of the reproduction information, a part of the plurality of pieces of the reproduction information corresponding to the real reproduction lists are able to be part of the plurality of pieces of the reproduction information corresponding to the virtual reproduction lists,
wherein the content information indicates a content of a piece of the reproduction information that is reproduced prior to the reproduction information, and is a representative image information corresponding to each of the plurality of pieces of the reproduction information which is controlled to be reproduced based on each of the reproduction lists, and
wherein the information reproducing method comprises
a controlling process for presenting, instead of the presentation of the piece of content information, prohibited reproduction list presence information which indicates the presence of the reproduction list corresponding to the piece of the content information to which the presentation is limited, when the presentation control information indicates that the presentation should be limited.

7. The information reproducing method according to claim 6,
wherein each piece of the content information is the representative image information corresponding to a representative image representing a content of the corresponding reproduction list, and
wherein the prohibited reproduction list presence information is alternative image information corresponding to an alternative image which makes a content of the representative image unrecognizable.

8. The information reproducing method according to claim 6,
wherein each piece of the content information is the representative image information corresponding to a representative image representing a content of the corresponding reproduction list, and
wherein the prohibited reproduction list presence information is information which should be displayed at a location where the representative image whose presentation is limited should be displayed.

9. A non-transitory information recording medium in which an information reproducing program causing a computer to function as the information reproducing apparatus according to claim 1 is recorded so that the program can be read by the computer.

10. An information recording apparatus comprising:
a reproduction information recording device that records a plurality of pieces of reproduction, information on a recording medium;
a reproduction list recording device that records a plurality of reproduction lists on the recording medium, each of the plurality of reproduction lists including different presentation control information which at least indicates whether or not a presentation of a piece of content information is limited; and
a content information recording device that records a plurality of content information on the recording medium,
wherein the plurality of reproduction lists are adapted for controlling a manner of reproduction that is executed when reproducing the plurality of pieces of the reproduction information, and include a plurality of real reproduction lists corresponding to the plurality of pieces of the reproduction information, and a plurality of virtual reproduction lists for reproducing a part of the plurality of pieces of the reproduction information beyond a section of each piece of the reproduction information, a part of the plurality of pieces of the reproduction information corresponding to the real reproduction lists are able to be the part of the plurality of pieces of the reproduction information corresponding to the virtual reproduction lists, and
wherein the content information indicates a content of a piece of the reproduction information that is reproduced prior to the reproduction information, and is a representative image information corresponding to each of the plurality of pieces of the reproduction information which is controlled to be reproduced based on each of the reproduction lists.

11. An information recording method comprising:
- a reproduction information recording processor recording a plurality of pieces of reproduction information on a recording medium;
- a reproduction list recording process for recording a plurality of reproduction lists on the recording medium, each of the plurality of reproduction lists including different presentation control information which at least indicates whether or not a presentation of a piece of content information is limited; and
- a content information recording process for recording a plurality of content information on the recording medium,
- wherein the plurality of reproduction lists are adapted for controlling a manner of reproduction that is executed when reproducing the plurality of pieces of the reproduction information, and include a plurality of real reproduction lists corresponding to the plurality of pieces of the reproduction information, and a plurality of virtual reproduction lists for reproducing a part of the plurality of pieces of the reproduction information beyond a section of each piece of the reproduction, information, a part of the plurality of pieces of the reproduction information corresponding to the real reproduction lists are able to be the part of the plurality of pieces of the reproduction information corresponding to the virtual reproduction lists, and
- wherein the content information indicates a content of a piece of the reproduction information that is reproduced prior to the reproduction information, and is a representative image information corresponding to each of the plurality of pieces of the reproduction information which is controlled to be reproduced based on each of the reproduction lists.

12. A non-transitory recording medium including:
- a plurality of pieces of reproduction information;
- a plurality of reproduction lists, each of the plurality of reproduction lists including different presentation control information which at least indicates whether or not a presentation of a piece of content information is limited; and
- a plurality of content information,
- wherein the plurality of reproduction lists are adapted for controlling a manner of reproduction that is executed when reproducing the plurality of pieces of the reproduction information, and include a plurality of real reproduction lists corresponding to the plurality of pieces of the reproduction information, and a plurality of virtual reproduction lists for reproducing a part of the plurality of pieces of the reproduction information beyond a section of each piece of the reproduction information, a part of the plurality of pieces of the reproduction information corresponding to the real reproduction lists are able to be the part of the plurality of pieces of the reproduction information corresponding to the virtual reproduction lists, and,
- wherein the content information indicates a content of a piece of the reproduction information that is reproduced prior to the reproduction information, and is a representative image information corresponding to each of the plurality of pieces of the reproduction information which is controlled to be reproduced based on each of the reproduction lists.

* * * * *